United States Patent
Kuroda et al.

(10) Patent No.: US 6,823,658 B2
(45) Date of Patent: Nov. 30, 2004

(54) EXHAUST GAS PURIFYING APPARATUS FOR AN INTERNAL-COMBUSTION ENGINE

(75) Inventors: Shigetaka Kuroda, Wako (JP); Shinichi Kitajima, Wako (JP); Katsuhiro Kumagai, Wako (JP); Futoshi Nishioka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/196,729

(22) Filed: Jul. 17, 2002

(65) Prior Publication Data

US 2003/0041591 A1 Mar. 6, 2003

(30) Foreign Application Priority Data

Aug. 28, 2001 (JP) ........................................ 2001-258813

(51) Int. Cl.[7] ................................................. F01N 3/00
(52) U.S. Cl. ............................ 60/277; 60/274; 60/285; 60/301
(58) Field of Search ............................ 60/274, 276, 277, 60/285, 300, 301

(56) References Cited

U.S. PATENT DOCUMENTS 5,771,685 A * 6/1998 Hepburn ...................... 60/277
6,205,773 B1 * 3/2001 Suzuki ......................... 60/276
6,269,634 B1 * 8/2001 Yokota et al. ................ 60/277
6,301,882 B1 * 10/2001 Manaka ....................... 60/285
6,318,075 B1 * 11/2001 Günther et al. .............. 60/285

FOREIGN PATENT DOCUMENTS

JP        10-299460        11/1998

* cited by examiner

Primary Examiner—Thomas E. Denion
(74) Attorney, Agent, or Firm—Arent Fox PLLC

(57) ABSTRACT

An exhaust gas purifying apparatus for an internal-combustion engine includes an exhaust gas purifier having a nitrogen oxide purifier for purifying nitrogen oxide contained in exhaust gases and an oxygen density sensor located downstream of the exhaust gas purifier. The apparatus further includes a sulfur oxide detector for detecting the density of sulfur oxide in the exhaust gas purifier, a sulfur-poisoning recovery apparatus for recovering the exhaust gas purifier from sulfur poisoning when the sulfur oxide detector determines the sulfur oxide density is high, a lean operation limiter for limiting the lean operation of the engine to such operation region that is not influenced so much by the sulfur poisoning after the exhaust gas purifier has been recovered from the sulfur poisoning, and a deterioration determiner for determining deterioration of the exhaust gas purifier based on the output of the oxygen density sensor during the lean operation of the engine.

15 Claims, 13 Drawing Sheets

EXHAUST GAS PURIFYING APPARATUS FOR AN INTERNAL-COMBUSTION ENGINE

BACKGROUND OF THE INVENTION

The present invention relates to an exhaust gas purifying apparatus for an internal-combustion engine, and more specifically to an exhaust gas purifying apparatus for an internal-combustion engine which can precisely determine deterioration of a nitrogen oxide (NOx) catalyst.

Conventionally, a NOx purifying device including a NOx trapping agent that is located in the exhaust system of the internal-combustion engine decreases NOx in the exhaust gas. Japanese Patent Application Unexamined Publication (Kokai) No. H10-299460 discloses a technique for determining deterioration of the NOx purifying device based on a delay time of outputs of the oxygen density sensors disposed upstream and downstream of the NOx purifying device when the fuel control air-fuel ratio of the internal-combustion engine has been set richer than a stoichiometric air-fuel ratio after the lean-burn operation is performed for a given time period. More specifically, as for this conventional technique, deterioration of the NOx purifying device is determined based on a fact that the delay time from the time the output of the upstream oxygen density sensor has changed to rich to the time the output of the downstream oxygen density sensor changes to rich is relatively large when the NOx trapping capability of the NOx purifying device is high, whereas such delay time becomes smaller as the NOx absorption capability degrades.

However, when the density of the sulfur oxide (SOx) becomes high in the peripheries of the oxygen density sensor, the output characteristic of the oxygen density sensor may change. Accordingly, from time to time, the conventional technique cannot precisely determine deterioration of the NOx purifying device when the engine is driven with fuel that contains high-density-sulfur. In other words, when the fuel control air-fuel ratio of the internal-combustion engine has been set richer after the lean-burn operation for a given time period, the output delay time of the oxygen density sensor located downstream of the NOx purifying device may become smaller due to the influence of SOx even if trapping capability of the NOx purifying device is sufficiently high. As a result, the NOx trapping capability cannot be correctly measured.

Thus, there is a need for a system that can correctly measure the NOx trapping capability of the NOx purifying device even if the engine is driven with fuel that contains high-density-sulfur.

SUMMARY OF THE INVENTION

According to an aspect of the present invention, an exhaust gas purifying apparatus for an internal-combustion engine is provided in order to achieve the aforementioned objective of the invention. The exhaust gas purifying apparatus comprises, in an exhaust system of the internal-combustion engine, an exhaust gas purifier or exhaust gas cleaner that includes a nitrogen oxide purifier for purifying nitrogen oxide contained in exhaust gas during a lean operation in which an air-fuel ratio of air-fuel mixture to be supplied to the internal-combustion engine is set leaner. The apparatus also includes an oxygen density sensor which is disposed downstream of the exhaust gas purifier. The exhaust gas purifying apparatus comprises a sulfur oxide detector for detecting density of sulfur oxide in the exhaust gas purifier, sulfur-poisoning recovery means for recovering the exhaust gas purifier from sulfur poisoning when the sulfur oxide detector determines that the sulfur oxide density is high. The exhaust gas purifying apparatus further comprises a lean operation limiter for limiting the lean operation of the internal-combustion engine to such operation region that is not significantly influenced by the sulfur poisoning after the exhaust gas purifier is recovered from the sulfur poisoning by the sulfur-poisoning recovery means. The exhaust gas purifying apparatus further comprises deterioration determining means for determining deterioration of the exhaust gas purifier based on output of the oxygen density sensor during the limited lean operation of the internal-combustion engine.

According to the invention, the operation of the internal-combustion engine is limited to an operation region having less sulfur exhaust by the lean operation limiter after the exhaust gas purifier is recovered from the sulfur poisoning. Accordingly, the deterioration determination upon the exhaust gas purifier could be performed in such condition that is not significantly influenced by the sulfur poisoning. Thus, it is possible to precisely measure the nitrogen oxide trapping capability of the exhaust gas purifier during the operation even with the high-density-sulfur containing fuel. Specifically, the operation is limited to such region in which the engine load is low, the engine rotational speed is low, the gear is in a high position and the vehicle speed is intermediate. The operation region is limited to prohibit the lean operation when the temperature of the internal-combustion engine is low leading to a low temperature of the exhaust gas. Trapping of the sulfur oxide (SOx) to the exhaust gas purifier (called "sulfur poisoning") relates with the exhaust gas temperature.

According to another aspect of the invention, the exhaust purifier in the exhaust gas purifying apparatus for the internal-combustion engine comprises a three-way catalyst and the nitrogen oxide purifier and comprises a second oxygen density sensor located between the three-way catalyst and the nitrogen oxide purifier. The sulfur oxide detector detects the sulfur oxide density through the second oxygen density sensor.

According to further aspect of the invention, the exhaust gas purifying apparatus for the internal-combustion engine comprises limitation canceling means for canceling the limitation by the lean operation limiter when the deterioration determining means determines that the exhaust gas purifier is normal. Thus, it is possible to return to a usual operation when it is determined that the exhaust gas purifier is normal.

DESCRIPTION OF THE PREFERRED EMBODIMENTS

Figure 1:
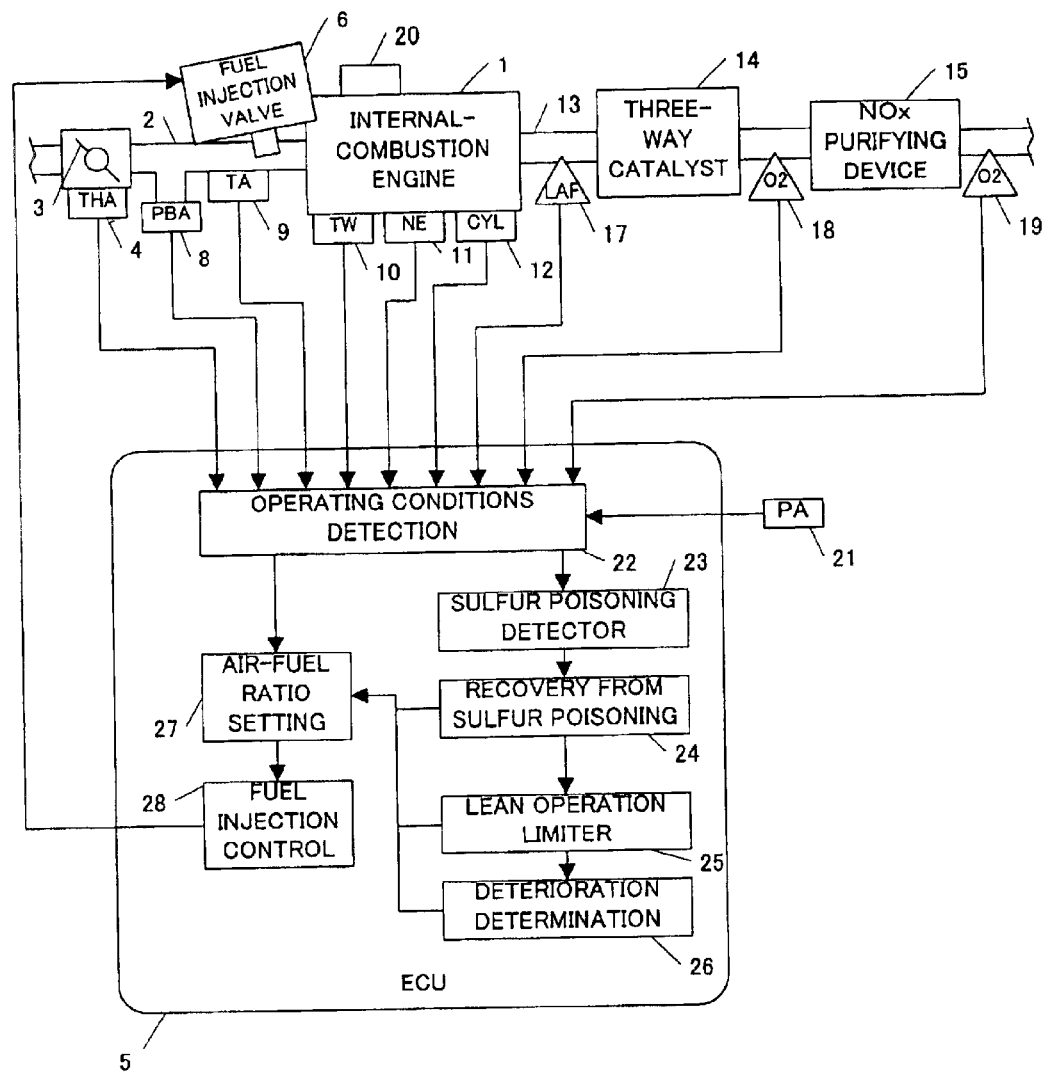
FIG. 1 is a diagram showing an overall arrangement of an internal-combustion engine and its controller according to one embodiment of the present invention.

FIG. 1 shows an overall arrangement of an internal-combustion engine (hereinafter referred to as an "engine") and its controller including a failure diagnostic device according to one embodiment of the present invention. A throttle valve 3 is disposed in the route of an air intake pipe 2 connected to an engine 1. The throttle valve 3 is connected to a throttle valve opening degree (THA) sensor 4. An electric signal that represents an opening degree of the throttle valve 3 is sent from the sensor 4 to an electronic control unit (hereinafter referred to as "ECU") 5. The structure of the ECU 5 will be described hereinafter.

A fuel injection valve 6 is provided, for each cylinder, between the engine 1 and the throttle valve 3 slightly upstream of the air intake valve (not shown) of the engine 1. An absolute air-intake-pipe internal pressure (PBA) sensor 8 and an intake air temperature (TA) sensor 9 are connected to the air intake pipe 2, so as to detect an absolute pressure and an intake air temperature respectively to provide them to the ECU 5 in the form of electric signals. An engine water temperature (TW) sensor 10, which is mounted on the main body of the engine 1, comprises a thermistor and the like. The sensor 10 detects an engine water temperature (cooling water temperature) TW and sends a corresponding electric signal to the ECU 5.

An engine revolution (NE) sensor 11 and a cylinder identification (CYL) sensor 12 are provided in the peripheries of the camshaft or the crankshaft (not shown) of the engine 1. The engine revolution sensor 11 outputs a TDC signal pulse at every top dead center point (TDC) when each cylinder of the engine 1 begins its intake stroke. The cylinder identification sensor 12 outputs a cylinder identification signal pulse at a predetermined crank angle for a specific cylinder. Those signal pulses are transmitted to the ECU 5.

A three-way catalyst 14 and a NOx purifier 15 or a NOx cleaner are disposed in an exhaust pipe 13. The three-way catalyst 14 is positioned upstream of the NOx purifier 15. The three-way catalyst has a function of accumulating O2 contained in the exhaust gas in an exhaust lean condition in which the air-fuel ratio of the mixture to be supplied to the engine 1 is leaner than a stoichiometric air-fuel ratio and the density of the O2 in the exhaust gas is comparatively high. In contrast, the catalyst oxidizes the HC and the CO contained in the exhaust gas using thus accumulated O2 in an exhaust rich condition in which the air-fuel ratio of the mixture to be supplied to the engine 1 is richer than the stoichiometric air-fuel ratio, the density of the O2 contained in the exhaust gas being low and the density of the HC, CO constituents contained in the exhaust gas being high.

The NOx purifier or NOx cleaner 15 incorporates a NOx trapping agent for trapping NOx and a catalyst for promoting oxidization and reduction. The NOx trapping agent traps the NOx in the exhaust lean condition in which the air-fuel ratio of the mixture to be supplied to the engine 1 is leaner than the stoichiometric air-fuel ratio. On the other hand, around the stoichiometric air-fuel ratio or in the exhaust rich condition in which the air-fuel ratio is richer than the stoichiometric air-fuel ratio, the trapped NOx is reduced by HC and CO and discharged in the form of nitrogen gas, while concurrently the HC and CO are oxidized and discharged in the form of steam and carbon dioxide.

When the trapping of NOx continues to reach an trapping capability limit of the NOx trapping agent, i.e., when the maximum NOx trapping volume is reached, no further NOx can be trapped. In such a case, the air-fuel ratio must be set richer in order to reduce and discharge the NOx. This operation is called a reduction-enrichment operation.

A linear oxygen density sensor (hereinafter referred to as an "LAF sensor") 17 is disposed upstream of the three-way catalyst 14. The LAF sensor 17 sends to the ECU 5 an electric signal that is substantially proportional to the oxygen density (air-fuel ratio) of the exhaust gas.

A binary type oxygen density sensor (hereinafter referred to as "O2 sensor") 18 is disposed between the three-way catalyst 14 and the NOx purifying device 15 and another binary type O2 sensor 19 is disposed downstream of the NOx purifying device 15. Signals detected by these sensors are transmitted to the ECU 5.

The O2 sensors 18, 19 have such characteristic that their outputs switch in a binary manner around the stoichiometric air-fuel ratio. That is, the output takes a high level on the rich side and takes a low level on the lean side. In the following description, the O2 sensor 18 and the O2 sensor 19 will be referred to as the "upstream O2 sensor" 18 and the "downstream O2 sensor" 19 respectively.

The engine 1 has a valve timing switch mechanism 20 that can alternately set the valve timings for the air intake valve and the air exhaust valve at two levels, one being a quick valve timing that is appropriate for a rapidly rotating region of the engine, and the other being a slow valve timing that is appropriate for a slowly rotating region. The switching of the valve timing includes the switching of the distance lifted by the valves. Further, when the slow valve timing is selected, one of the two valves is halted in order to ensure stable combustion, even when the air-fuel ratio is leaner than the stoichiometric air-fuel ratio.

Additionally, an atmospheric pressure sensor 21 for detecting the atmospheric pressure (PA) is connected to the ECU 5. The detected signal is supplied to the ECU 5.

The ECU 5 includes a ROM for storing programs and data, and a RAM for providing an operational workspace to store/retrieve programs and data required at the runtime. It also includes a CPU for executing programs and an input interface for processing input signals from various sensors and a drive circuit for sending control signals to such engine sections as the fuel injection valve 6. All outputs from the various sensors are received by the input interface and are processed in accordance with the programs stored in the ROM. With such a hardware structure, functional blocks in FIG. 1 represent ECU 5.

The ECU 5 comprises functional blocks of an operating condition detector 22, sulfur-poisoning detector 23, sulfur-poisoning recovery means 24, lean operation limiter 25, deterioration determining means 26, air-fuel ratio setting means 27 and fuel injection controller 28.

The operating condition detector 22 detects operating conditions of the engine based on various parameters of the engine described heretofore. The sulfur-poisoning detector 23 detects sulfur poisoning of the three-way catalyst 14 based on the output of the upstream O2 sensor 18. The sulfur-poisoning recovery means 24 performs an enrichment of the air-fuel ratio so as to remove SOx and recovers the three-way catalyst 14 when the sulfur poisoning of the three-way catalyst 14 is detected.

In order to decrease the influence of the SOx upon the deterioration determination for the NOx purifying device 15 which leads to a wrong diagnosis, the lean operation limiter 26 limits the lean operation of the engine 1 to a region having less SOx poisoning after the three-way catalyst 14 has been recovered by the sulfur-poisoning recovery means 24. The deterioration determination means 26 performs the deterioration determination for the NOx purifying device 15 based on the output of the downstream O2 sensor 19 when the air-fuel ratio of the mixture to be supplied to the engine 1 has been enriched.

The air-fuel ration setting means 27 sets a target air-fuel ratio based on the determined operating conditions, setting for enriching the air-fuel ratio made by the sulfur-poisoning recovery means, and permission or prohibition of the lean operation by the lean operation limiter. The fuel injection controlling means 28 calculates, according to the following equation (1), a fuel injection time TOUT of the fuel injection valve 6 which is opened in synchronization with the TDC signal pulse, so as to control the fuel injection valve 6.

$$TOUT = TIM \times KCMD \times KLAF \times KPA \times K1 + K2 \quad (1)$$

In the equation (1), TIM represents a base fuel amount, or, more specifically, a base fuel injection time of the fuel injection valve 6, which is to be determined through searching a TI map which is set based on the engine rotational speed NE and the absolute air-intake-pipe internal pressure PBA. The TI map is set so that the air-fuel ratio of the mixture to be supplied to the engine may become almost equal to the stoichiometric air-fuel ratio under the operating condition corresponding to the engine rotational speed NE and the absolute air-intake-pipe internal pressure PBA. In other words, the base fuel amount TIM is almost in proportion to the intake air amount per unit time of the engine (mass flow rate).

KCMD represents a target air-fuel ratio coefficient, which is set in accordance with such engine operating parameters as engine rotational speed NE, throttle valve opening degree THA and engine water temperature TW. The target air-fuel coefficient KCMD is proportional to the fuel-air ratio F/A which is the reciprocal of air-fuel ratio A/F, and has a value of 1.0 at the stoichiometric air-fuel ratio. Accordingly, the coefficient KCMD is also called a target equivalent ratio. Besides, the target air-fuel coefficient KCMD is set to a predetermined enrichment value KCMDRR or KCMDRM for enriching the air-fuel ratio when the reduction enrichment or the deterioration determination for the NOx purifying device 15 is performed as described below.

KLAF represents an air-fuel ratio correction coefficient that is calculated under the STR control so that a detected equivalent ratio KACT, which is obtained from a detected value provided by the LAF sensor 17, matches the target equivalent ratio KCMD when execution conditions for the feedback control are satisfied.

KPA represents an atmospheric pressure correction coefficient to be set in accordance with the atmospheric pressure PA. It is set to be 1.0 (an uncorrected value) when the atmospheric pressure PA is almost equal to 101.3 kPa. The value of PA is set larger than 1.0 in accordance with the decrease of the atmospheric pressure PA, so that the fuel supply amount may be corrected so as to be increased. Thus, the atmospheric pressure correction coefficient KPA is set so as to increase in accordance with the decrease of the atmospheric pressure PA, and the fuel supply amount is corrected so as to be increased in accordance with the decrease of the atmospheric pressure PA.

K1 and K2 represent another correction coefficient and a correction variable that are obtained in accordance with various engine parameter signals. They are determined to be certain predetermined values with which various characteristics such as the fuel characteristics and engine acceleration characteristics depending on the engine operating conditions are optimized.

Figure 2:
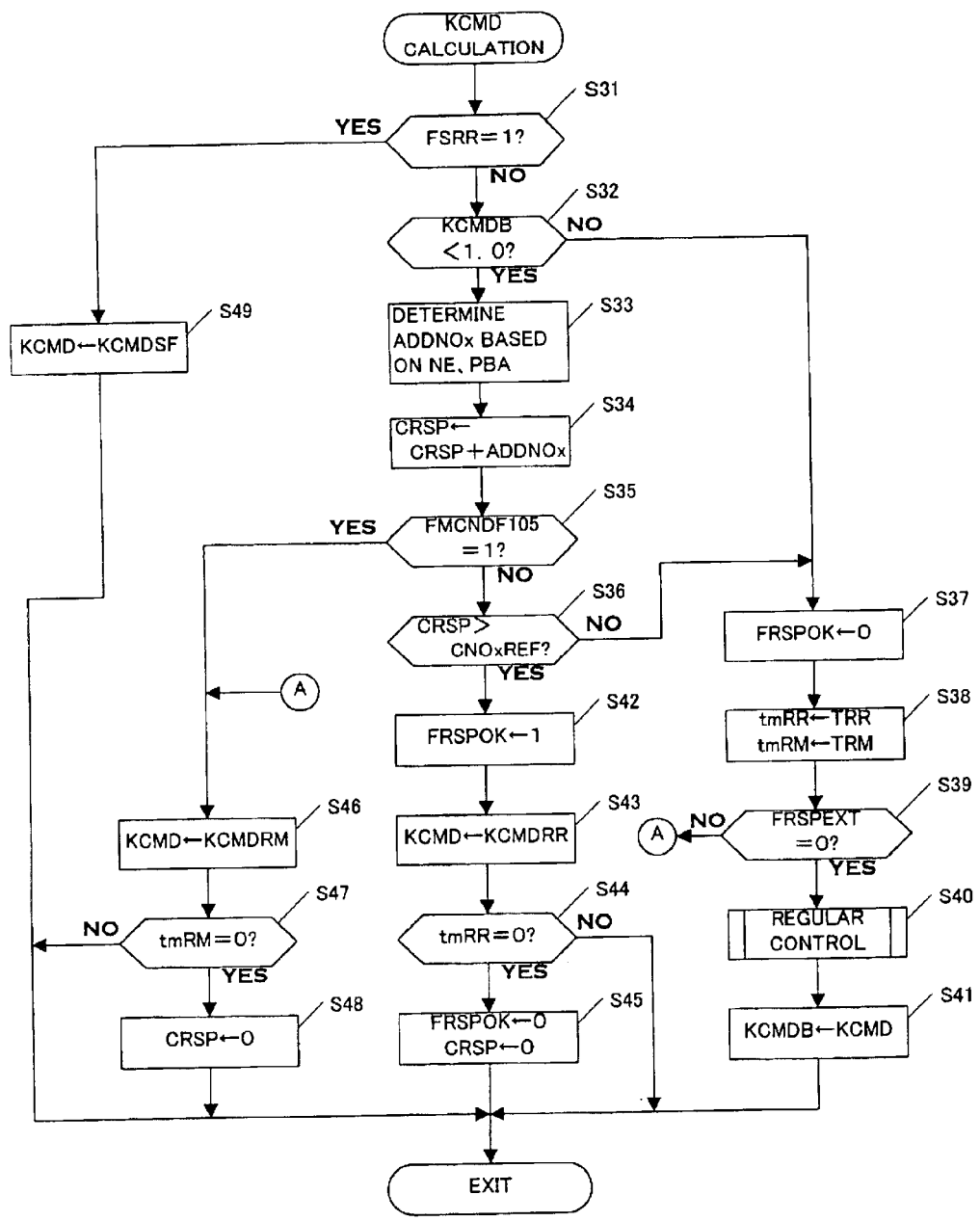
FIG. 2 is a flowchart showing a process for calculating a target air-fuel ratio coefficient KCMD.

FIG. 2 is a flowchart showing a process for calculating the target air-fuel ratio coefficient KCMD to be applied to the above-referenced equation (1). The ECU 5 performs this process at a constant time interval.

In step S31, when a SOx removal enrichment flag FSRR is set to 1, it indicates that an enrichment of the air fuel ratio is performed for removing the SO2 accumulated in the three-way catalyst 14. When FSRR is set to 1, the target air-fuel ratio coefficient KCMD is set to a predetermined value KCMDSF (for example, 1.03) for the SOx removal enrichment in step S49.

When FSRR is set to zero, it is determined in step S32 whether or not the lean operation is underway, in other words, whether or not a stored value KCMDB of the target air-fuel ratio coefficient KCMD to be stored in step S41 (to be described hereinafter) during the regular control is less than 1.0. When KCMDB is equal to or larger than 1.0, which indicates that the lean operation is not underway, the process proceeds to step S37, in which a reduction enrichment flag FRSPOK is set to zero (if it is set to 1, it indicates a reduction-enrichment is being performed). Then, in step S38, count-down timers tmRR and tmRM, which will be referred to in steps S44, S47 (to be described later), are started after their initial values are set to a reduction enrichment time TRR and TRM respectively (for example, 5 to 10 seconds).

Next, in step S39, it is determined whether or not an enrichment continuation flag FRSPEXT is set to zero. This flag is set to 1 by a deterioration determination process of FIG. 9 (to be described later) so as to indicate that the enrichment of the air-fuel ratio should be continued even after the deterioration determination of the NOx purifying device 15 would have been completed. When FRSPEXT=1, the process proceeds to step S46, in which the enrichment of the air-fuel ratio is continued.

When FRSPEXT=0, the operation is performed under the regular control and the target air-fuel ratio coefficient KCMD is set in accordance with the engine operating conditions in step S40. The target air-fuel ratio coefficient KCMD is basically calculated in accordance with the engine rotational speed NE and the absolute air-intake-pipe internal pressure PBA. KCMD may be changed to another value depending on different operating conditions, such as the conditions where the engine water temperature TW is low and the conditions where the engine is operated in a heavy load condition. Next, in step S41, the target air-fuel ratio coefficient KCMD calculated in step S40 is stored as a stored value KCMDB and the process exits here. In such engine operating condition where the lean operation is allowed, the target air-fuel ratio coefficient KCMD is set to a value smaller than 1.0.

When KCMDB<1.0 in step S32, which indicates that the lean operation is underway, an increment value ADDNOx is determined in accordance with the engine rotational speed NE and the absolute air-intake-pipe internal pressure PBA in step S33. The increment value ADDNOx, which is a parameter corresponding to the amount of NOx which is exhausted per unit time during the lean operation, is set such that it increases in accordance with the increase of the engine rotational speed NE and the increase of the absolute air-intake-pipe internal pressure PBA.

In step S34, a NOx amount counter CRSP is incremented by the increment value ADDNOx as shown in the following equation (2), so as to obtain a count value which is equivalent to the NOx exhaust amount, that is, the NOx amount trapped by the NOx trapping agent.

$$CRSP=CRSP+ADDNOx \qquad (2)$$

Next, in step S35, it is determined whether or not an execution condition flag FMCNDF105 is set to 1. The execution condition flag FMCNDF105 is set to 1 when the conditions for executing the deterioration determination of the NOx purifying device 15 are satisfied, as will be shown in FIG. 4 and FIG. 5. Usually, because FMCNDF105=0, the process proceeds to step S36, in which it is determined whether or not the value of the NOx amount counter CRSP has exceeded an allowance value CNOxREF. When the value of the NOx amount counter CRSP has not exceeded the allowance value CNOxREF, the process proceeds to step S37, in which the operation is controlled as usual unless the enrichment continuation flag FRSPEXT is set to 1. The allowance value CNOxREF is set to a value corresponding to, for example, a NOx amount that is slightly smaller than the maximum NOx absorption capability of the NOx trapping agent.

When CRSP>CNOxREF in step S36, the reduction enrichment flag FRSPOK is set to 1 in step S42, and then the target air-fuel ratio coefficient KCMD is set to a predetermined enrichment value KCMDRR corresponding to about 14.0 of the air-fuel ratio, so as to perform a reduction enrichment in step S43. Then, in step S44, it is determined whether or not the value of the timer tmRR is zero. While tmRR>0, this process exits. When tmRR=0 in step S44, the value of the reduction enrichment flag FRSPOK is set to zero and the value of the NOx amount counter CRSP is also reset to zero in step S45. Accordingly, from the next process cycle, the answer in step S36 becomes "NO", so that the operation is performed under the usual control.

On the other hand, when the conditions for the deterioration determination are satisfied (that is, when FMCNDF105=1 in step S35), the process proceeds from step S35 to step S46, in which the target air-fuel ratio coefficient KCMD is set to a predetermined deterioration determination enrichment value KCMDRM (<KCMDRR) corresponding to a slightly leaner value than a value equivalent to about 14.0 of the air-fuel ratio, so that the deterioration determination may be performed. The reason why the degree of enrichment is set smaller than when the regular reduction enrichment is performed is that the enrichment execution time may be shortened and wrong determination may easily occur at the deterioration determination time for the NOx purifying device 15 if the degree of enrichment is larger. Thus, the accuracy of the deterioration determination could be improved by means of setting the degree of enrichment smaller and prolonging the enrichment execution time. Besides, because of such smaller enrichment degree, the outputs of the O2 sensors 18 and 19 become sensitive to the SOx, so that the determination accuracy under the high SOx density condition could be improved.

In step S47, it is determined whether or not the value of the timer tmRM is zero. While tmRM>0, the process exits here. When tmRM=0, the value of the NOx amount counter CRSP is reset to zero in step S48.

According to the processing of FIG. 2, the reduction enrichment is usually carried out intermittently (S43 and S44) under such operating condition where the lean engine operation is possible, so that the NOx that has been trapped by the NOx trapping agent of the NOx purifying device 15 can be reduced properly. Also, when the conditions for the deterioration determination for the NOx purifying device 15 are satisfied, the degree of enrichment is set smaller than the reduction enrichment and the deterioration determination is performed over a longer time period than the reduction enrichment (S46, S47). Besides, SOx removal enrichment is carried out when the SOx removal is performed (S31 and S49). Additionally, when the enrichment continuation flag FRSPEXT is set to 1 in step S174 of FIG. 10 (to be described later), the target air-fuel ratio coefficient KCMD is maintained at the predetermined enrichment value KCMDRM even after the deterioration determination of the NOx purifying device 15 has been completed, so that the air-fuel ratio enrichment may be continued.

Figure 3:
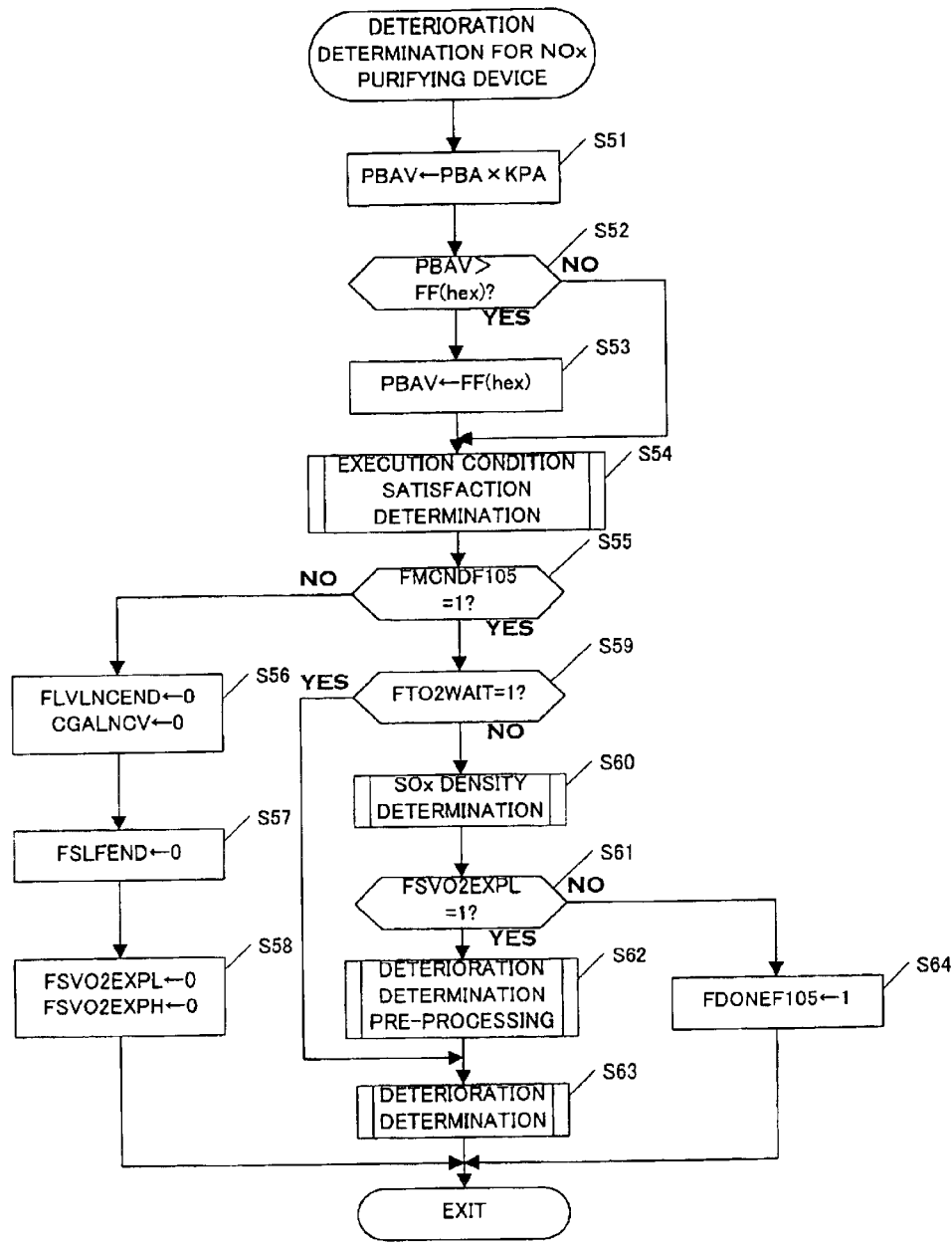
FIG. 3 is a flowchart showing a main routine for a deterioration determination process upon the NOx purifying device.

FIG. 3 is a flowchart of a main routine for a deterioration determination process of the NOx purifying device 15. The ECU 5 in synchronization performs this process with the occurrence of the TDC signal pulses. In this process, the deterioration of the NOx purifying device 15 is determined by measuring the NOx trapping capability of the NOx trapping agent based on the output of the downstream O2 sensor 19.

In step S51, the absolute air-intake-pipe internal pressure PBA is corrected according to the following equation (3):

$$PBAV=PBA \times KPA \qquad (3)$$

In the equation (3), KPA represents an atmospheric pressure correction coefficient to be decided depending on the output of the atmospheric pressure sensor PA, and PBAV represents an absolute air-intake-pipe internal pressure after correction with the atmospheric pressure (which will be hereinafter referred to as simply "corrected absolute pressure).

In step S52, it is determined whether or not the corrected absolute pressure PBAV exceeds a maximum value ("FF" in hexadecimal). When it is smaller than the maximum value, the process proceeds to step S54. When it exceeds the maximum value, the maximum value FF is set on the corrected absolute pressure PBAV in step S53, and the process proceeds to step S54. The corrected absolute pressure PBAV which has been obtained here may be used in some subsequent processes including an intake air amount accumulation process.

Figure 4:
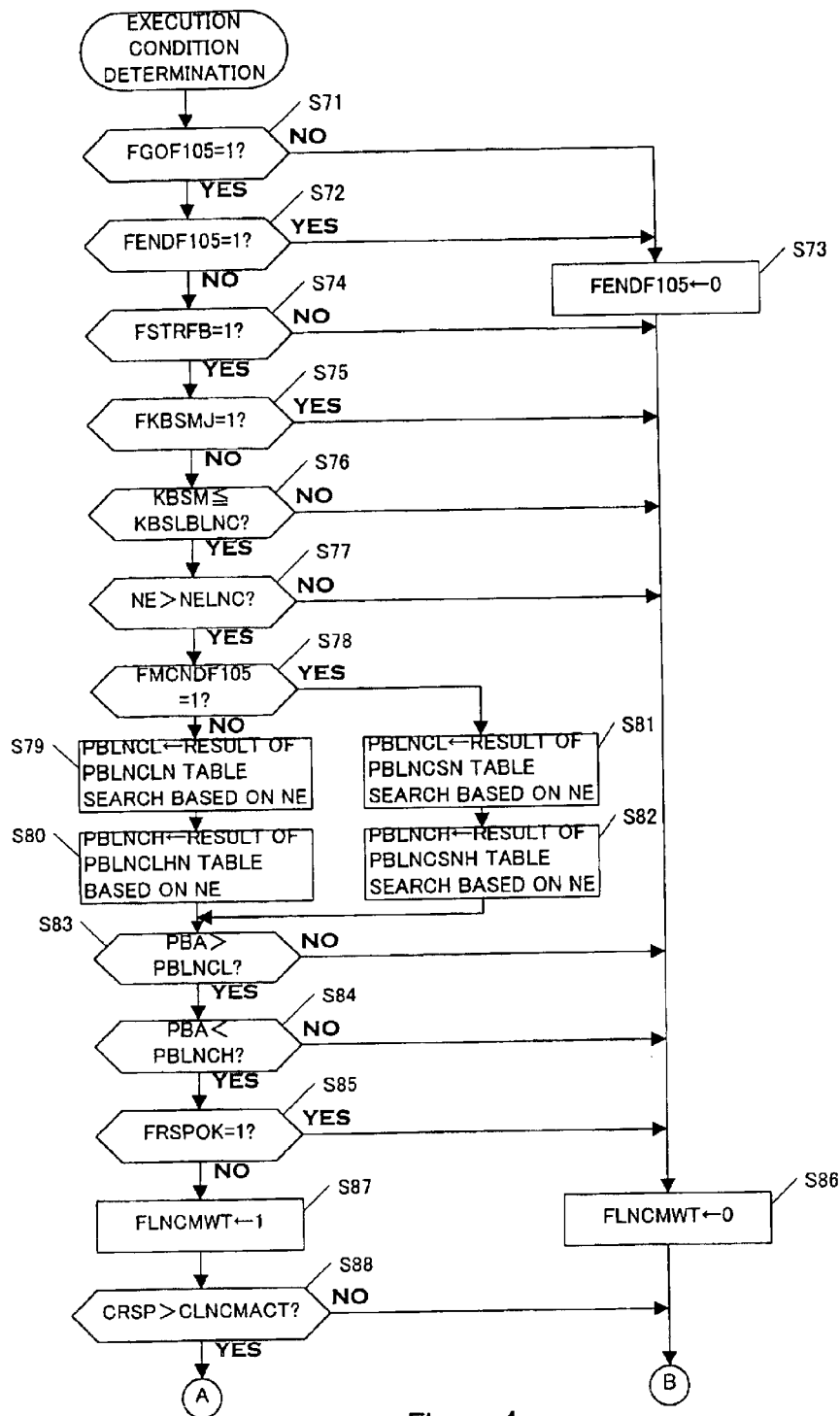
FIG. 4 is a flowchart showing an execution condition satisfaction determination process.
Figure 5:
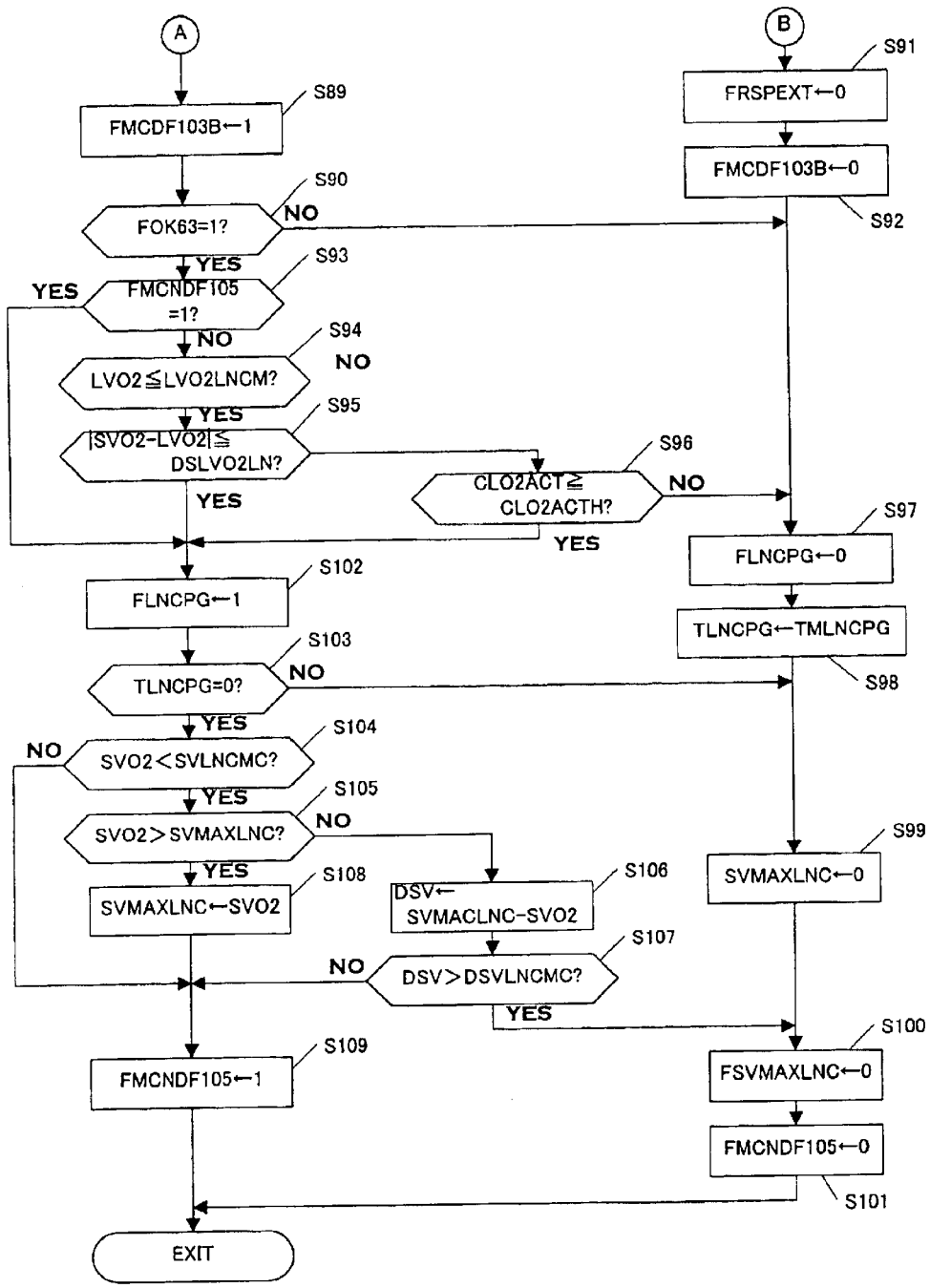
FIG. 5 is a flowchart, continued from FIG. 4, of the execution condition satisfaction determination process.
Figure 7:
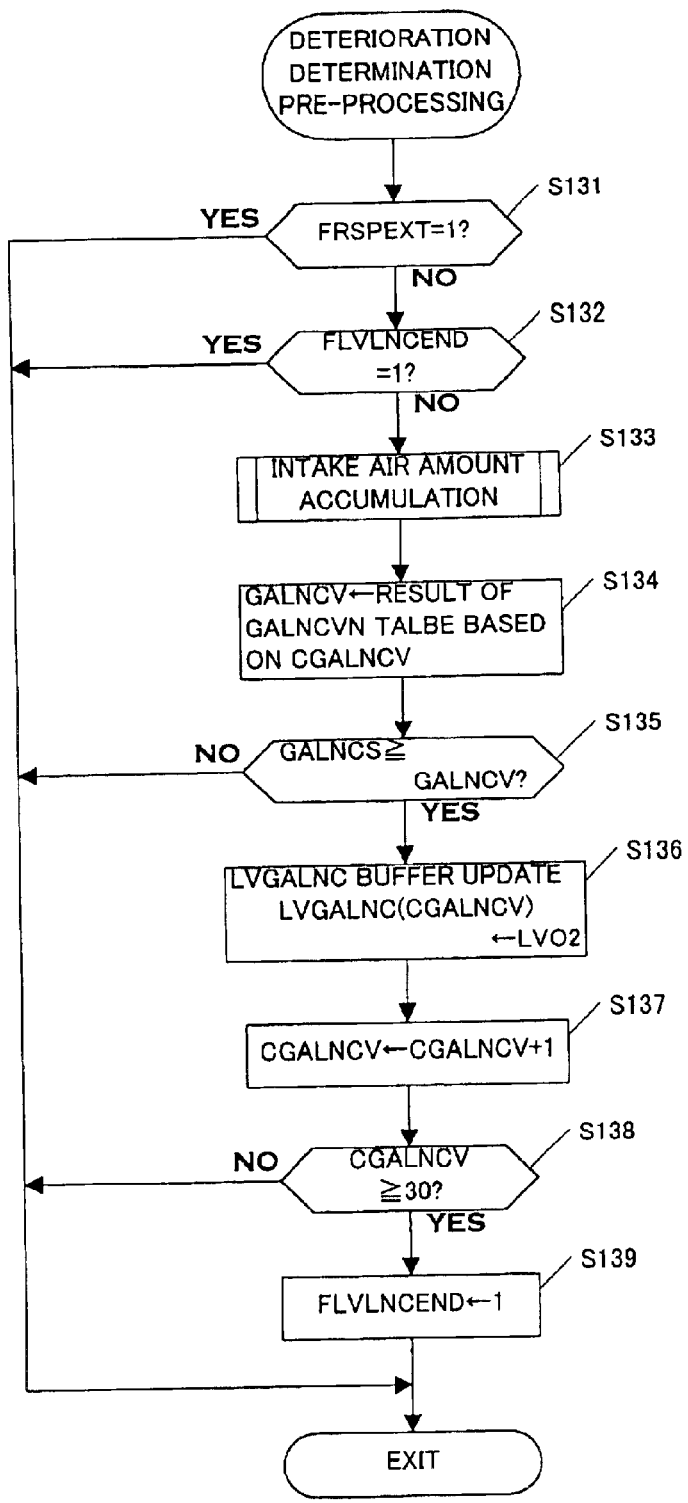
FIG. 7 is a flowchart showing a deterioration determination pre-processing.

In step S54, an execution condition determination process to be described later with reference to FIG. 4 and FIG. 5 is performed. In this process, the execution condition flag FMCNDF105 is set to 1 when the conditions for executing the deterioration determination for the NOx purifying device 15 are satisfied. In step S55, it is determined whether or not the execution condition flag FMCNDF105 is set to 1. When FMCNDF105=0 indicating the execution conditions are not satisfied, the process proceeds to step S56, in which a deterioration determination pre-processing completion flag FLVLNCEND and a counter CGALNCV, which are set in a deterioration determination pre-processing to be described with reference to FIG. 7, are set to zero. Subsequently, in step S57 and step S58, a SO2 density determination completion flag FSLFEND, a first reference-exceeding flag FSVO2EXPL and a second reference-exceeding flag FSVO2EXPH are all set to zero, and this process exits here.

Figure 6:
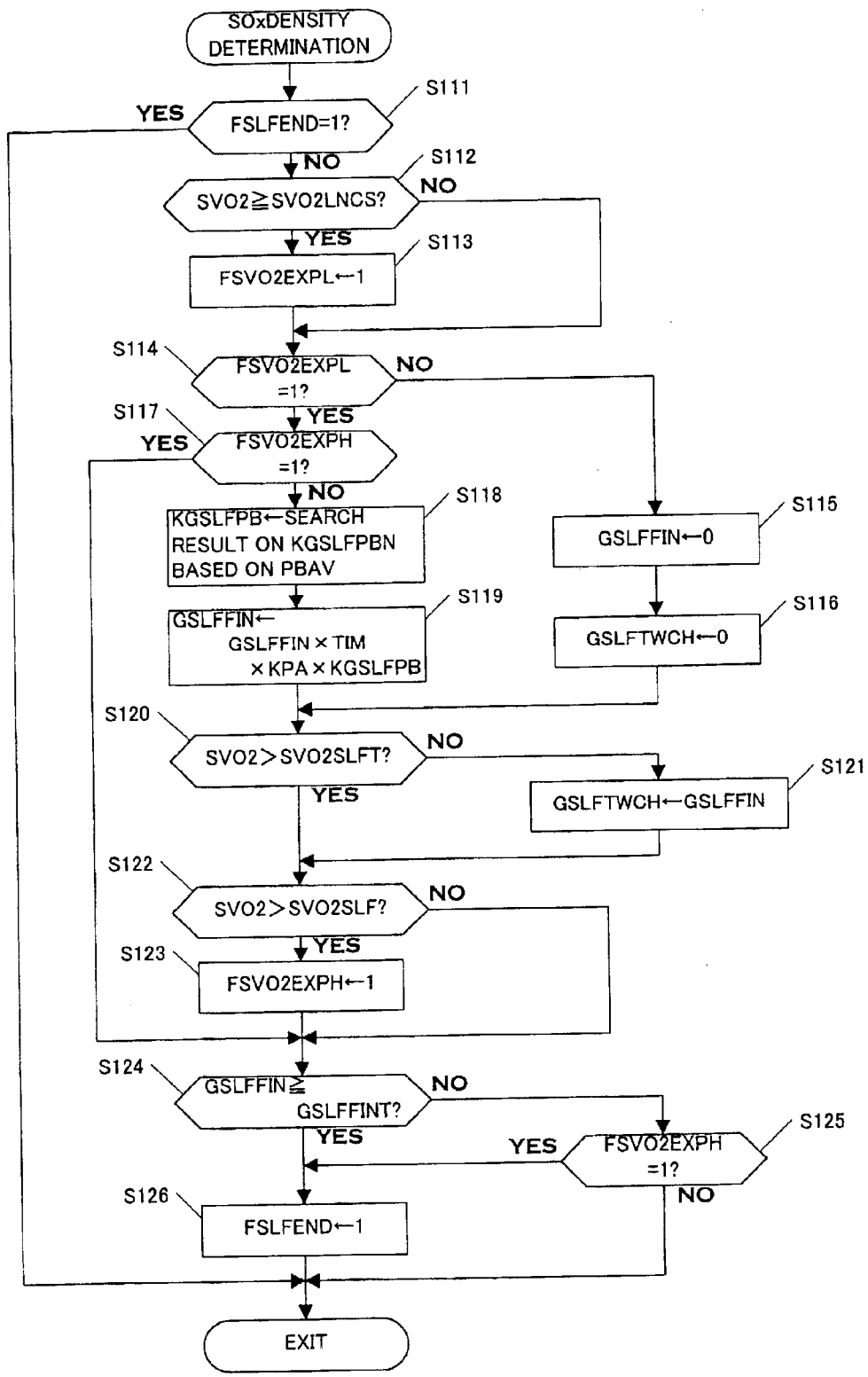
FIG. 6 is a flowchart showing a SOx density determination process.

The SOx density determination completion flag FSLFEND is set to 1 when the SOx density determination process shown in FIG. 6 is completed. The first reference-exceeding flag FSVO2EXPL is set to 1 when the upstream O2 sensor output SVO2 reaches an upstream reference value SVO2LNC (for example, 0.3 volts indicating that SVO2 started to rise) in step S113, FIG. 6. The second reference-exceeding flag FSVO2EXPH is set to 1 when the upstream O2 sensor output SVO2 exceeds a second upstream reference value SVO2SLF (for example, 0.8 volts, which SVO2 would exceed if SOx density is low). Thus, FSVO2EXPH=1 indicates that SOx density is low.

When the execution condition flag FMCNDF105=1 in step S55, which indicates that the execution conditions of the deterioration determination for the NOx purifying device 15 are satisfied, it is determined in step S59 whether or not a downstream sensor determination result waiting flag FTO2WAIT has been set to 1 in the deterioration determination process to be described with reference to FIG. 10. Initially, because FTO2WAIT=0, the process proceeds to step S60, in which an SOx density determination process shown in FIG. 6 is performed, and then, in step S61, it is determined whether or not the first reference exceeding flag FSVO2EXPL is set to 1. When FSVO2EXPL=1, a deterioration determination process is carried out in step S63 and the NOx purifying device deterioration determination process exits. When FTO2WAIT=1 in step S59, which indicates that a failure determination for the downstream O2 sensor 19 is being waited, the deterioration determination process is carried out immediately in step S63. When FSVO2EXPL=0 in step S61, the flag FDONEF105 is set to 1 in step S64, and this process exits.

FIG. 4 and FIG. 5 are a flowchart of the execution condition satisfaction determination process carried out in step S54 of FIG. 3. In this process, in order to stably determine the deterioration of the NOx purifying device 15 and secure the frequencies of the various monitors, the execution possibility of the deterioration determination for the NOx purifying device is decided considering various parameters.

In step S71, it is determined whether or not a deterioration determination instruction flag FGOF105 is set to 1. Because it is sufficient to perform the deterioration determination of the NOx purifying device 15 at a rate of about once one operation period (a period from the engine start to the stop), the deterioration determination instruction flag FGOF105 is set to 1 at the moment when the state of the engine operation has become stable after the engine is started. It should be noted that the deterioration determination is not permitted when any other monitoring is underway because such monitoring may influence the result of the deterioration determination. When the deterioration determination instruction flag FGOF105=1, it is determined in step S72 whether or not a deterioration determination completion flag FENDF105 has been set to 1 in step S179, FIG. 10.

When determination in step S71 is NO indicating that the deterioration determination is not permitted, or when the answer in step S72 is YES indicating that the deterioration determination has been completed, the deterioration determination completion flag FENDF105 is reset to zero in step S73, and a deterioration determination pre-condition satisfaction flag FLNCMWT is set to zero in step S86. This flag is to be set to 1 to indicate the conditions for the deterioration determination are satisfied.

When determination in step S72 is NO, it is determined in step S74 whether or not a STR feedback execution flag FSTRFB is set to 1. FSTRFB=1 indicates that the STR feedback control by a STR (Self Tuning Regulator) is underway. The STR will be described later. This STR feedback control is to calculate the air-fuel ratio correction coefficient KLAF according to the equation (1). In another embodiment, such calculation may be performed with a PID feedback control with proportion terms and/or integral terms.

When determination in step S74 is YES, it is determined in step S75 whether or not a lean-burn prohibition flag FKBSMJ is set to 1. In order to prohibit the lean-burn operation, the lean-burn prohibition flag FKBSMJ is set to 1 by a lean-burn prohibition determination process. The lean-burn prohibition determination process is carried out under the fuel injection control as well as in parallel to the NOx purifying device determination process shown in FIG. 3. So, the lean-burn prohibition flag FKBSMJ may be referred to at any time.

When FKBSMJ=0 in step S75, it indicates that the lean-burn operation is permitted. Next, in step S76, it is determined whether or not the target air-fuel ratio KBSM is equal to or smaller than a predetermined value KBSLBLNC (for example, 20). When KBSM is equal to or smaller than KBSMLNC, it indicates the lean-burn operation is underway. Subsequently in step S77, it is determined whether or not the engine rotational speed NE exceeds a map value NELNC. This determination is performed so as not to perform the deterioration determination when the engine rotational speed is lower than a predetermined value.

When determinations in step S74, S76 and S77 are NO, or when the answer in step S75 is YES, it is determined that the conditions for the deterioration determination are not satisfied, so that the deterioration determination pre-condition satisfaction flag FLNCMWT is set to zero in step S86.

When the answer in step S77 is YES, it is determined in step S78 whether or not a deterioration determination execution condition flag FMCNDF105 is set to 1. Initially, because FMCNDF105=0, a lower threshold value PBLNCL is set to a value which is gained through searching a PBLNCLN table based on the engine rotational speed NE in step S79 and then an upper threshold value PBLNCH is set to a value which is gained through searching a PBLNCLHN table based on the engine rotational speed NE in step S80.

When FMCNDF105=1 in step S78, the lower threshold value PBLNCL is set to a value that is gained through searching a PBLNCSN which value is smaller than the PBLNCLN table based on the engine rotational speed NE in step S81 and then the upper threshold value PBLNCH is set to a value which is gained through searching a PBLNCSHN table which value is smaller than the PBLNCLHN table based on the engine rotational speed NE in step S82. Steps S79 through S82 are to set a region for determining the load of the engine 1 in accordance with the absolute air-intake-pipe internal pressure PBA.

In step S83, it is determined whether or not the absolute air-intake-pipe internal pressure PBA is larger than the lower threshold value PBLNCL. When PBA>PBLNCL, it is determined in step S84 whether or not the absolute air-intake-pipe internal pressure PBA is smaller than the upper threshold value PBLNCH. When the answer in step S83 or S84 is NO, in other words, when the absolute air-intake-pipe internal pressure PBA is smaller than the lower threshold value PBLNCL or larger than the upper threshold value PBLNCH, the pre-condition satisfaction flag FLNCMWT is set to zero in step S86.

When both answers in step S83 and S84 are YES, in other words, when PBLNCL<PBA<PBLNCH, it is determined in step S85 whether or not the reduction enrichment execution flag FRSPOK is set to 1. When FRSPOK=1, the deterioration determination is not performed because the reduction enrichment is being performed, and the process proceeds to step S86. When FRSPOK=0, a deterioration determination pre-condition satisfaction flag FLNCMWT is set to 1 in step S87.

Next, in step S88, it is determined whether or not the value of the NOx amount counter CRSP exceeds a deterioration determination permission value CLNCMACT. When CRSP does not exceed CLNCMACT, the process proceeds to step S91 in FIG. 5, in which the enrichment continuation flag FRSPEXT is set to 1, and then, in step S92, a downstream O2 sensor failure determination condition flag FMCDF103B is set to zero. When the downstream O2 sensor failure determination condition flag FMCDF103B is set to 1, it indicates that the conditions for executing a failure determination process (not shown) for the downstream sensor 19 are satisfied.

When CRSP>CLNCMACT in step S88, it is determined that the amount of the NOx trapped by the NOx trapping agent is large enough to perform the deterioration determination of the NOx purifying device 15. Accordingly, the downstream O2 sensor failure determination condition flag FMCDF103B is set to 1 in step S89, and then, in step S90, it is determined whether or not the upstream O2 sensor determination flag FOK63 is set to 1.

When determination in step S90 is YES, it is determined in step S93 whether or not an execution condition flag FMCNDF105 has already been set to 1. Initially, because FMCNDF105=0, the process proceeds to step S94, in which it is determined whether or not the downstream O2 sensor output LVO2 is equal to or smaller than a first downstream reference value LVO2LNCM (for example, 0.3V). This step is to confirm that the downstream O2 sensor output LVO2 before the execution of the deterioration determination enrichment indicates an exhaust lean condition. When FMCNDF105=1 in step S93, the above-described determination steps are not performed and the process proceeds directly to step S97.

When LVO2 is equal to or smaller than LVO2LNCM in step S94 indicating that the downstream O2 sensor output LVO2 indicates the exhaust lean condition, it is determined in step S95 whether or not an absolute difference value |SVO2-LVO2| between the upstream O2 sensor output SVO2 and the downstream O2 sensor output LVO2 is equal to or smaller than a predetermined value DSLVO2LN. This step is to confirm that both upstream O2 sensor output SVO2 and the downstream sensor output LVO2 are in a lean condition and further that their difference is very small. When the answer is YES, the process proceeds to step S102.

When the answer in step S95 is NO, a purge cut flag FLNCPG is set to zero in step S97 and a countdown timer TLNCPG is started after it is set to a predetermined time TMLNCPG (for example, two seconds) in step S98. Subsequently, a maximum value parameter SVMAXLNC is set to zero in step S99, a flag FSVMAXLNC is set to zero in step S100, an execution condition flag FMCNDF105 is set to zero in step S101, and this process exits.

The purge cut flag FLNCPG when it is set to 1 indicates that purging of evaporated fuel in the fuel tank to the intake pipe 2 should be prohibited. The maximum value parameter SVMAXLNC is a parameter representing a maximum value of the upstream O2 sensor output SVO2 before the upstream O2 sensor output SVO2 reaches a second upstream reference value SVO2SLF (for example, 0.8V).

When the answer of step S95 is YES, the purge cut flag FLNCPG is set to 1 in step S102. This is to forcibly cut the purging of evaporated fuel because the density of the purging is uncertain and accordingly a wrong detection may easily happen. Next, in step S103, it is determined whether or not the value of the timer TLNCPG which has been started in step S98 is zero. While TLNCPG>0, the process proceeds to step S99. The timer TLNCPG is used for the purpose of waiting for a given time period for the influence of the purging to disappear after the purging is cut.

When the value of the timer TLNCPG becomes zero in step S103, the process proceeds to step S104, in which it is determined whether or not the upstream O2 sensor output SVO2 is less than a third upstream reference value SVLNCMC (for example, 0.7V). When SVO2 is not less than SVLNCMC, the process proceeds to step S109, in which the deterioration determination execution condition flag FMCNDF105 is set to 1.

When the upstream O2 sensor output SVO2 is smaller than the third upstream reference value SVLNCMC, it is determined in step S105 whether or not the upstream O2 sensor output SVO2 exceeds the maximum value parameter SVMAXLNC. Because the maximum value parameter SVMAXLNC is initialized to zero in step S99, the answer in step S105 is YES at first. So, the maximum value parameter SVMAXLNC is set to the current value of the O2 sensor output SVO2 in step S108, and then the execution condition flag FMCNDF105 is set to 1 in step S109.

When the upstream O2 sensor output SVO2 increases monotonously, the answer in step S105 always becomes YES. However, the output sometimes may decrease temporarily. In such a case, the answer of step S105 becomes NO and then, in step S106, a difference DSV between the maximum value parameter SVMAXLNC and the O2 sensor output SVO2 is calculated according to the following equation (4):

$$DSV = SVMAXLNC - SVO2 \quad (4)$$

Then, it is determined in step S107 whether or not the difference DSV is more than a predetermined value DSVLNCMC. When the answer is NO indicating that the difference is not so significant, the execution condition flag FMCNDF105 is set to 1 in step S109.

When the difference DSV exceeds the predetermined value DSVLNCMC, it is considered that the air-fuel ratio has temporarily become in an exhaust lean condition due to the engine acceleration or other events. If the deterioration determination is continued in such case, there is a possibility of occurrence of wrong determination. Accordingly, the execution condition is regarded to be unsatisfactory and the deterioration determination is stopped. Thus, the flag FSVMAXLNC is set to zero in step S100, the execution condition flag FMCNDF105 is set to zero in step S101, and this process exits.

According to the deterioration determination execution condition determination process shown in FIG. 4 and FIG. 5, the conditions for the deterioration determination execution of the NOx purifying device 15 are basically satisfied when the pre-condition satisfaction flag FLNCMWT is set to 1. However, if the predetermined time has not elapsed since the evaporated fuel purge was prohibited, the execution condition is determined to be unsatisfied in step S103. Besides, under such conditions where the upstream O2 sensor output SVO2 is smaller than the third upstream reference value SVLNCMC, when the temporary decrease amount (DSV) becomes larger than the predetermined value DSVLNCMC (namely, when the answer in step S107 is YES), the execution condition is determined to be unsatisfied.

FIG. 6 is a flowchart of the SOx density determination process in step S60 of FIG. 3. When high-density-sulfur containing fuel is being used, the three-way catalyst 14 may be influenced by the SOx. In this case, the downstream sensor 19 may not turn to the rich side completely. For that reason, there may be a wrong estimation for the trapped amount of NOx by the NOx purifying device 15, which may eventually result in a wrong deterioration determination. Therefore, according to the process flow shown in FIG. 6, SOx density determination is performed so as to determine whether high-density-sulfur containing fuel is used or not.

In step S111, it is determined whether or not the SOx density determination completion flag FSLFEND has been set to 1. When the answer is YES, the SOx density determination process is not performed at this time. Initially, because FSLFEND=0, the process proceeds to step S112, in which it is determined whether or not the upstream SO2 sensor output SVO2 is equal to or larger than a first upstream reference value SVO2LNCS. Initially, because SVO2<SVO2LNCS, the process skips step S113 to proceed to step S114, in which it is determined whether or not a first reference exceeding flag FSVO2EXPL has been set to 1. This flag is set to 1 in step S113. Accordingly, initially, this answer is NO. So, a first exhaust amount parameter GSLFFIN is set to zero in step S115 and a parameter GSLFTWCH is set to zero in step S116. The process proceeds to step S120.

In step S120, it is determined whether or not the upstream O2 sensor output SVO2 has exceeded a fourth upstream reference value SVO2SLFT. Initially, since this answer is NO, a parameter GSLFTWCH is set to a first cumulative intake air amount value GSLFFIN that is calculated in step S119.

Then, in step S122, it is determined whether or not the upstream O2 sensor output SVO2 has exceeded a second upstream reference value SVO2SLF (for example, 0.8V, which SVO2 would exceed if SOx density is low). Initially, since this answer is NO, the process skips step S123 to step S124.

In step S124, it is determined whether or not the first cumulative intake air amount value GSLFFIN is equal to or larger than a determination threshold value GSLFFINT. Initially, since this answer is NO, it is determined in step S125 whether or not a flag FSVO2EXPH to be set in step S123 has been set to 1. Initially, because this answer is NO, this process exits here.

When the upstream O2 sensor output SVO2 has reached the first upstream reference value SVO2LNCS, the first reference exceeding flag is set to 1 in step S113 and the process proceeds to step S117 via step 114. In step S117, it is determined whether or not a flag FSVO2EXPH to be set to 1 in step S123 has been set to 1. Initially, since this answer is NO, the process proceeds to step S118, in which a table KGSLFPBN is searched so as to obtain a value corresponding to the corrected intake air absolute pressure PBAV calculated in step S51 of FIG. 3. The obtained value is set to a correction coefficient KGSLFPB.

Then, a first cumulative intake air amount value GSLFFIN is calculated according to the following equation (5):

$$GSLFFIN = GSLFFIN \times TIM \times KPA \times KGSLFPPB \quad (5)$$

In the equation (5), GSLFFIN represents the previously calculated value and TIM and KPA respectively represent the base fuel amount and the atmospheric pressure correction coefficient that are used in the equation (1). Since TIM is the base fuel amount, that is, a fuel amount to be set so that the air-fuel ratio becomes equal to the stoichiometric air-fuel ratio in accordance with the operating conditions (the engine rotational speed NE and the absolute air-intake-pipe internal pressure PBA), it is a parameter which is proportional to the intake air amount (that is, the exhaust gas amount) per unit time of the engine 1. The first cumulative intake air amount value GSLFFIN, which is obtained according to the equation (5), is a value corresponding to a cumulative value of the exhaust gas amount which has been flowing into the NOx purifying device 15 from the time the upstream O2 sensor output SVO2 crosses the first upstream reference value SVO2LNCS till the time it reaches SVO2SLF.

Because the air-fuel ratio is maintained at the predetermined enrichment value (KCMDRM), which is richer than the stoichiometric air-fuel ratio during the deterioration determination process, this first cumulative intake air amount value GSLFFIN is in proportion to the cumulative amount of the reduction constituents (HC, CO) contained in the exhaust gas. Besides, the first cumulative intake air amount value GSLFFIN is in proportion to the elapse time since the accumulation has been started as long as the engine operation condition is almost constant. The same is true with respect to other cumulative intake air amount values which will be described later.

When the upstream O2 sensor output SVO2 is between the first upstream reference value SVO2LNCS and a fourth upstream reference value SVO2SLFT (for example, 0.7V), the process proceeds from step S120 to step S122 via step S121. When the upstream O2 sensor output SVO2 exceeds SVO2SLFT, the process jumps from step S120 to step S122. When SVO2 exceeds the second upstream reference value SVO2SLF, which as described heretofore SVO2 would exceed if SOx density is low, the process proceeds from step S122 to step S123, and the second reference exceeding flag FSVO2EXPH is set to 1. As described heretofore, this flag indicates that SOx density is low.

When the first cumulative intake air amount value GSLFFIN is smaller than a determination threshold value GSLFFINT, the process proceeds from step S124 to step S125. At this time, because flag FSVO2EXPH is 1, the process proceeds to step S126, in which the SOx density determination completion flag FSLFEND is set to 1, and the process exits here.

Following will further describe the aforementioned SO2 density determination. When the SOx density is high, the output will not exceed SVO2SLF by the influence of the SOx even if enough time has elapsed. In this situation, when a saturated value of the upstream O2 sensor output SVO2 has not reached a reference value within a given time by the influence of the SOx, the fuel is determined to be high-density sulfur containing fuel. In other words, when the upstream O2 sensor output SVO2 does not exceed the second upstream reference value SVO2SLF at the time when the first cumulative intake air amount value GSLFFIN, has reached the determination threshold value GSLFFINT, it is determined that SOx density is high in the peripheries of the upstream O2 sensor 18. When the SOx density is high, the time for the upstream O2 sensor output SVO2 to reach the second upstream reference value SVO2SLF gets longer in some cases. In other cases the upstream O2 sensor output SVO2 remains at a value smaller than the second upstream reference value SVO2SLF. The process shown in FIG. 6 can determine the SOx density in either case.

High-density-sulfur containing fuel specifically means that SOx density in the exhaust gas becomes about 600 PPM and more. When such fuel is used, the O2 sensor output may be influenced by the SOx.

Besides, when the three-way catalyst 14 is deteriorated, the SOx density becomes higher at the downstream side.

When the NOx purifying device 15 is disposed downstream of the three-way catalyst 14 as in the embodiment, the O2 sensor output may change due to SOx to lower the accuracy of determining deterioration of the NOx purifying device 15. Thus, when the SOx density is high, prohibiting the deterioration-determining process of the NOx purifying device 15 will enhance accuracy of determining deterioration.

Besides, the tendency of lowering of the saturation output of the O2 sensor is prominent when enrichment degree of the air-fuel ratio is smaller. Therefore, in this embodiment, the target air-fuel ratio coefficient KCMD during the deterioration determination process is set to a predetermined deterioration determination enrichment value KCMDRM corresponding to an air-fuel ratio that is slightly richer (for example, about air-fuel ratio 14.3) than the stoichiometric air-fuel ratio.

Figure 9:
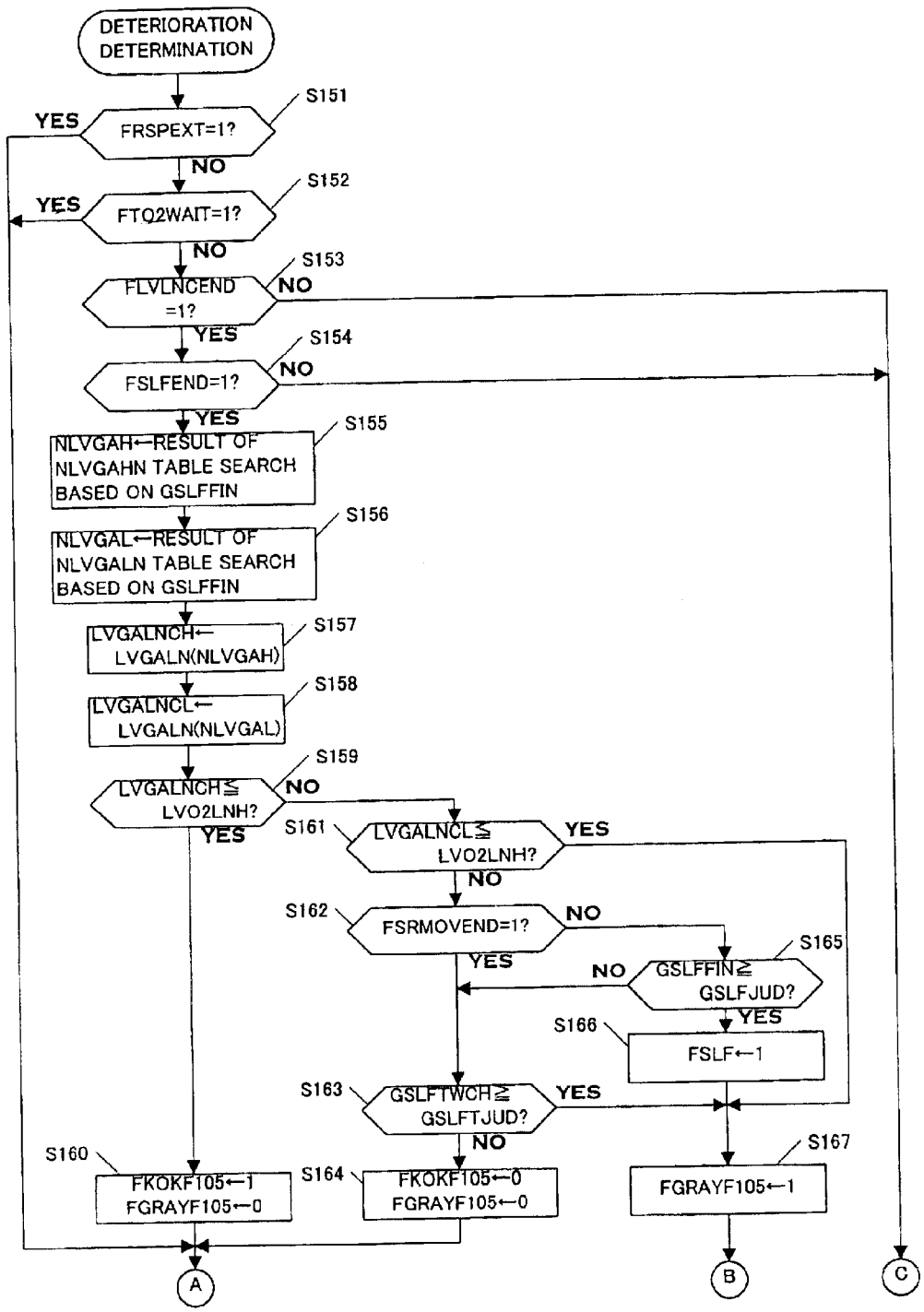
FIG. 9 is a flowchart showing a deterioration determination process.
Figure 10:
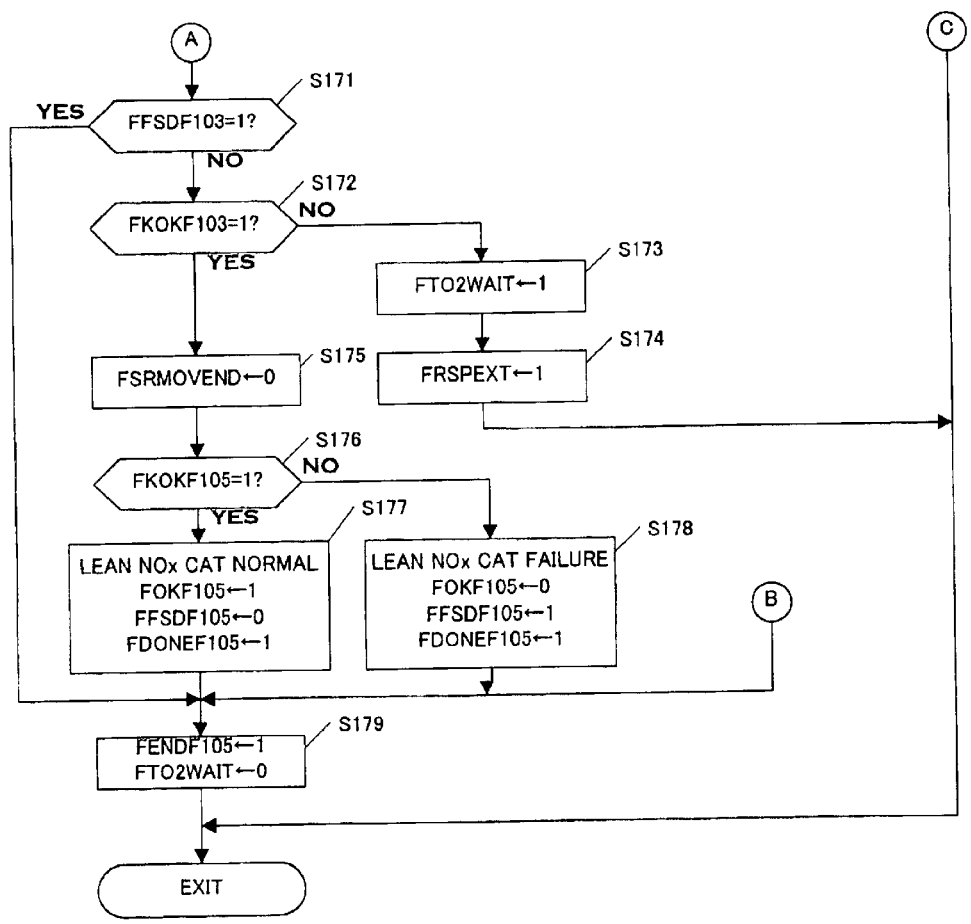
FIG. 10 is a flowchart, continued from FIG. 9, of the deterioration determination process.

Referring now to FIGS. 7, 9 and 10, the deterioration determination process of the NOx purifying device 15 will be described. This process is to detect deterioration of the characteristics of the NOx purifying device 15 based on the lean output maintenance time of the downstream O2 sensor 19 (or exhaust gas amount) when the air-fuel ratio is changed from lean to rich.

Figure 8:
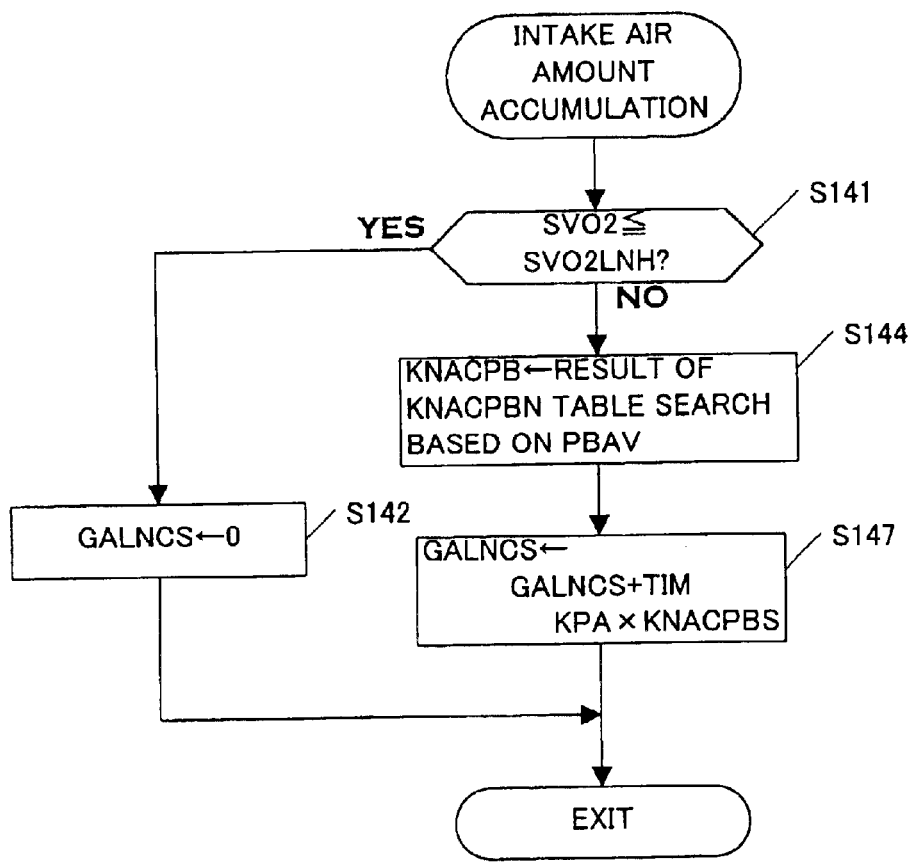
FIG. 8 is a flowchart showing an intake air amount accumulation process.

FIG. 7 is a flowchart of a deterioration determination pre-process in step S62 of FIG. 3. In step S131, it is determined whether or not the enrichment continuation flag FRSPEXT is set to 1. Initially, FRSPEXT=0, so the process proceeds to step S132, in which it is determined whether or not a deterioration determination pre-processing completion flag FLVLNCEND has been set to 1. The flag FLVLNCEND is set to 1 in step S139. Initially, it is zero. So, the process proceeds to step S133, in which an intake air amount accumulation process shown in FIG. 8 is performed. When FRSPEXT=1 in step S131 or when FLVLNCEND=1 in step S132, the process exits here.

In step S141 of FIG. 8, it is determined whether or not the upstream O2 sensor output SVO2 is equal to or smaller than a fifth upstream reference value SVO2LNH (for example, 0.6V). When SVO2 is equal to or smaller than SVO2LNH, a second cumulative intake air amount value GALNCS is set to zero in step S142, and the process exits here.

When the upstream O2 sensor output SVO2 exceeds the upstream reference value SVO2LNH, a KNACPBN table is searched based on the corrected absolute pressure PBAV in step S144, so as to calculate an air-intake-pipe internal pressure correction coefficient KNACPB.

Next, in step S147, a second cumulative intake air amount value GALNCS is calculated according to the following equation (6):

$$GALNCS = GALNCS + TIM \times KPA \times KNACPBS \qquad (6)$$

In the equation (6), GALNCS in the right member represents the previously calculated value and TIM and KPA respectively represent the base fuel amount and the atmospheric pressure correction coefficient. In other words, in the equation (6), the corrected fuel injection amounts are accumulated so as to obtain the intake air amount.

The second cumulative intake air amount value GALNCS, which is obtained according to the equation (6), is a value corresponding to a cumulative value of the exhaust gas amount which has been flowing into the NOx purifying device 15 since the time when the upstream O2 sensor output SVO2 exceeded the upstream reference value SVO2LNH.

Referring back to FIG. 7, in step S134, a GALNCVN table is searched based on the count value of the counter CGALNCV, so as to calculate a threshold value GALNCV. This table is set so that GALNCVN increases as the count of the counter CGALNCV increases. Next, in step S135, it is determined whether or not the second cumulative intake air amount value GALNCS calculated in step S133 is equal to or larger than the threshold GALNCV. When GALNCS<GALNCV, the process exits here. When GALNCS is equal to or larger than GALNCV, the downstream O2 sensor output LVO2 is stored in the buffer LVGALNC that corresponds to the count value of the counter CGALNCV (S136). Thirty buffers LVGALNC in total are provided.

In step S137, the counter CGALNCV is incremented by 1. In step S138, it is determined whether the count value has reached 30 or not. When it has not reached 30 yet, the process exits here. Thus, the downstream O2 sensor output LVO2 is stored in the buffers LVGALNC repeatedly until the counter reaches 30. When the counter reaches 30 (S138), a flag FLVLNCEND is set to 1 (S139).

Following the deterioration determination pre-processing, the deterioration determination process shown in FIG. 9 and FIG. 10 is performed. In step S151, it is determined whether or not the enrichment continuation flag FRSPEXT has been set to 1. This flag is set to 1 in step S174. Initially, because FRSPEXT=0, the process proceeds to step S152, in which it is determined whether or not the downstream O2 sensor determination result waiting flag FTO2WAIT is set to 1. This flag is set to 1 in step S173. Initially, because FRSPEXT=0, the process proceeds to step S153.

In step S53, it is determined whether or not the pre-processing completion flag FLVLNCEND has been set to 1. When FLVLNCEND=0, downstream O2 sensor output LVO2 has not completely been stored in the LVGALNC buffers yet. The process exits here. When FLVLNCEND=1 (S153), which indicates that the pre-processing has been completed, it is determined in step S164 whether or not the SOx density determination flag FSLFEND has been set to 1. When FSLFEND=0, which indicates that the deterioration determination has not been completed yet, the process exits here without performing deterioration determination. When FSLFEND=1 in step S154, the process proceeds to step S155.

In step S155, a NLVGAHN table (FIG. 11) is searched to obtain an upper reference value NLVGAH based on the value GSLFFIN obtained in the SOx density determination process described with reference to FIG. 6. Next, in step S156, the NLVGALN table (FIG. 11) is searched to obtain a lower reference value NLVGAL based on the value GSLFFIN. Then, in step S157, the LVO2 value stored in the LVGALN buffers is retrieved based on the searched NLVGAH, and the retrieved LVO2 is set as a first value to be examined LVGALNCH. In step S158, the value stored in the LVGALN buffers is retrieved based on the searched NLVGAL, and the retrieved value is set as a second value to be examined LVGALNCL. As can be seen from the table shown in FIG. 11, the value LVGALNCH is a downstream O2 sensor output LVO2 having delay relative to the one retrieved from the value LVGALNCL (longer time has elapsed since FMCNDF105 was set to 1).

Steps S155 through S158 decide, out of the downstream O2 sensor outputs LVO2 that have been stored in the buffers in certain timing in the deterioration determination pre-process, data of which timing is to be retrieved based on the first cumulative intake air amount GSLFFIN.

Figure 11:
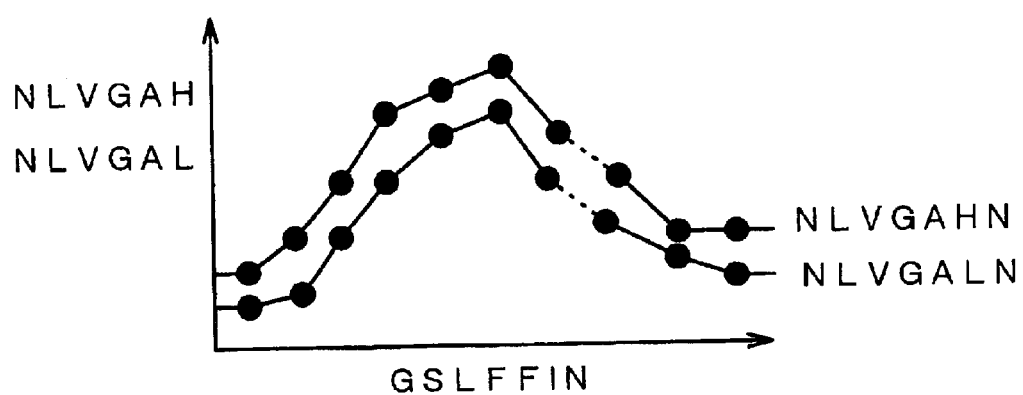
FIG. 11 is a table to be used in the deterioration determination process.

Both NLVGAL and NLVGAH tables are arranged as shown in FIG. 11 so as to first determine influence by the SOx or influence of deterioration of the three-way catalyst by experiment and to retrieve data (LVO2 output) of such timing that can avoid these influence, thereby preventing a wrong detection that may otherwise be caused by the influence of SOx. Thus, the influence on the downstream O2 sensor 19 by the SOx can be avoided and accordingly accuracy of deterioration determination of the NOx purifying device 15 will improve. In another embodiment, instead of using the buffers, the intake air amount may be first accumulated from the reversal of the upstream O2 sensor output SVO2 to the reversal of the downstream O2 sensor output LVO2. The accumulated intake air amount may be corrected using the tables shown in FIG. 11, or may be compared with a determination threshold value retrieved form the tables shown in FIG. 11.

In step S159, it is determined whether or not the first LVO2 value LVGALNCH is equal to or smaller than a reference value LVO2LNH to determine if LVO2 is in a lean state. If YES, it is determined that the NOx purifying device 15 is in a good shape and accumulating sufficient amount of NOx. So, in step S160, a temporary determination flag FKOKF105 is set to 1 and a determination pending flag FGRAYF105 is set to zero, and the process proceeds to step S171.

When LVGALNCH>LVO2LNH in step S159, the process proceeds to step S161, in which it is determined whether or not the second LVO2 value LVGALNCL is equal to or smaller than the reference value LVO2LNH indicating that the LVO2 is in a lean state. If it is YES, it means that a confusing condition is being observed because in step S159 LVO2 was determined to be in a rich state. Thus, deterioration determination of the NOx purifying device 15 cannot be readily done, the process proceeds to step S167, in which the determination pending flag FGRAYF105 is set to 1. The flag FGRAYFl05 is to be set to 1 in order to indicate that the deterioration of the NOx purifying device cannot be determined at this moment.

When the answer in step 161 is NO, indicating that the downstream O2 sensor 19 is in a rich. In this case, it is determined in step S162 whether or not a SOx removal completion flag FSRMOVEND has been set to 1. This flag is to be set in the SOx removal process which will be later described with reference to FIG. 12.

When FSRMOVEND=1, which indicates that the SOx removal has been completed, it is determined in step S163 whether or not the exhaust amount parameter GSLFTWCH, which is to be set in step S121 of FIG. 8, is equal to or larger than a reference value GSLFJUD. When the answer is NO, that is, GSLFTWCH<GSLFTJUD, which indicates that the NOx purifying device 15 may be deteriorated, the temporary determination flag FKOKF105 is set to zero and the determination pending flag FGRAYF105 is set to zero in step S164, and the process proceeds to step S171 of FIG. 10.

When FSRMOVEND=0, which indicates that the SOx removal has not been completed yet, it is determined in step S165 whether or not the first cumulative intake air amount value GSLFFIN is equal to or larger than the reference value GSLFJUD. When this answer is NO, the process proceeds to step S163. When GSLFFIN is equal to or larger than GSLFJUD, which indicates that there exists some influence of the SOx, the high density flag FSLF is set to 1 in step S166, the determination pending flag FGRAYF105 is set to 1 in step S167 and the process proceeds to step S179 of FIG. 10.

When the answer in step S163 is YES, that is, GSLFTWCH is equal to or larger than GSLFJUD, the process proceeds to step S167 as well. This is because a normal deterioration determination is difficult to carry out when high-density-sulfur containing fuel is being used even if the SOx removal process is performed.

In step S171 of FIG. 10, it is determined whether or not a downstream O2 sensor failure flag FFSDF103 has been set to 1. The flag FFSDF103 is to be set to 1 when it is determined that the downstream O2 sensor 19 is in failure. When FFSDF103=1, which indicates that the downstream O2 sensor 19 is in failure, the process proceeds to step S179, in which a deterioration determination completion flag FENDF105 is set to 1 and a downstream O2 sensor determination result waiting flag FTO2WAIT is set to zero, and the deterioration determination process exits here.

When FFSDF103=0 in step S171, which indicates that the downstream O2 sensor 19 is not in failure, it is determined in step S172 whether or not an O2 sensor OK flag FKOKF103 has been set to 1. The O2 sensor OK flag FKOKF103 is to be set to 1 when the downstream 2 sensor is determined to be normal. When FKOKF103=0 indicating that the downstream 2 sensor is not normal, in order to continue the air-fuel ratio enrichment for performing the failure determination on the downstream O2 sensor 19, the determination result waiting flag FTO2WAIT is set to 1 in step S173 and the enrichment continuation flag FRSPEXT is set to 1 in step S174, and the process exits here.

When the answer in step S151 or in step S152 is YES in the subsequent routine cycles, the process proceeds to step S171.

When FKOKF103=1 in step S172, which indicates that the downstream O2 sensor 19 is determined to be normal, the SOx removal completion flag FSRMOVEND is set to zero in S175 and, in step S176, it is determined whether or not the temporary determination flag FKOKF105 has been set to 1. When the temporary determination flag FKOKF105 has been set to 1, which indicates that the NOx purifying device 15 is normal, the normality flag FOKF105 is set to 1, the failure flag FFSDF105 is set to zero, and a deterioration determination done flag FDONEF106 is set to 1 in step S177, and the process proceeds to step S179. It is sufficient that deterioration determination for the NOx purifying device 15 is done once in one driving cycle.

When the temporary determination flag FKOKF105 is set to zero in step S176, which indicates that the NOx purifying device 15 is in failure, the normality flag FOKF105 is set to zero, the failure flag FFSDF105 is set to 1 and the deterioration determination done flag FDONEF105 is set to 1 in step S178, and the process proceeds to step S179.

In step S179, the deterioration determination end flag FENDF105 is set to 1, the determination result waiting flag FTO2WAIT is reset to zero, and the process exits here.

According to the process of FIG. 9 and FIG. 10, deterioration of the characters of the NOx purifying device 15 is determined based on the lean output maintenance period of the downstream O2 sensor 19 (exhaust gas amount) during the enrichment determination process.

The values LVGALNCH and LVGALNCL which have been retrieved from the outputs LVO2 of the downstream O2 sensor 19 that have been buffered in the deterioration determination pre-process of FIG. 7 based on the cumulative intake air amount (or exhaust gas amount) are provided as the downstream sensor output for use with deterioration determination. The LVO2 values, which are stored in the LVGALN buffers, are retrieved by referring to the table (as shown in FIG. 11) that is pre-established based on experiment or simulation. In such a way, the downstream O2 sensor output can be retrieved after an appropriate time has elapsed (that is, under nominal influence of SOx) since output of the upstream O2 sensor reversed to the rich side.

When the first determination value LVGALNCH is equal to or smaller than the reference value (that is, when the answer in step S159 is YES), it is determined that the NOx is substantially accumulated in the NOx purifying device 15 as the downstream sensor output is still lean although sufficiently long time has elapsed since output of the upstream O2 sensor reversed to the rich side. Accordingly, the temporary determination flag FKOKF105, which temporarily determines that the NOx purifying device 15 is normal, is set to 1 in step S160.

Secondly, when LVGALNCH>LVO2LNH and when the second determination value LVGALNCL exceeds the reference value LVO2LNH (that is, when the answer in step S161 is NO), it is determined that the NOx is not sufficiently accumulated in the NOx purifying device 15 as output of the downstream O2 sensor 19 reversed to the rich side within a short period since output of the upstream O2 sensor reversed to the rich side. However, even in this case, when the SOx removal process has not been performed yet (that is, FSRMOVEND=1 in step S162) and when the cumulative intake air amount is equal to or larger than the predetermined value GSLFJUD, the high density determination flag FSLF is set to 1 in step S166, and furthermore the determination pending flag FGRAYF105 is set to 1 in step S167, so that the current deterioration determination is suspended. If the deterioration determination is performed based on the output of the downstream O2 sensor 19 when the SOx removal is not performed, accuracy of deterioration determination will decrease. Therefore, in this case, the SOx removal process is carried out once, which is to be described hereafter.

However, when the SOx removal process has already been performed or when the cumulative intake air amount GSLFFIN is smaller than the predetermined value GSLFJUD, and when GSLFTWCH<GSLFTJUD, the temporary determination flag FKOKF105 is set to zero because it is possible that NOx purifying device 15 is deteriorated.

When LVGALNCH>LVO2LNH and LVGALNCL>LVO2LNH, in other words, when the downstream O2 sensor output is lean after a short time and is rich after a long time, the determination depending flag FGRAY105 is set to 1 in step S167 so as to suspend the deterioration determination because there is a high possibility of wrong determination of deterioration of NOx purifying device 15.

Thus, it is possible to accurately determine deterioration of NOx purifying device 16 because the downstream O2 sensor output can be referred to at appropriate time utilizing the LVGALN buffer and the table of FIG. 11 with respect to influence of the sulfur constituents in the exhaust gas flowing into NOx purifying device 16 and deterioration state of the three-way catalyst.

The deterioration determination will be suspended if the downstream O2 sensor 19 is determined to be in failure (that is, FFSDF103=1 in step S171) after the value of FKOKF105 is set. This is because the deterioration determination cannot be properly performed if the downstream O2 sensor 19 is in failure. When it is not determined that the downstream O2 sensor 19 is normal (namely, FKOKF103=0 in step S172), the enrichment extension flag FRSPEXT is set to 1, and air-fuel ratio enrichment is extended in order to determine failure of the downstream O2 sensor 19. This process is performed for the following reasons. Movement of the output of downstream O2 sensor 19 may not be quick because the downstream O2 sensor 19 is located downstream of the three-way catalyst 14 and the NOx purifying device 15. Thus, when the air-fuel ratio is set richer at the time of determining deterioration of the NOx purifying device, it is not possible to determine failure of the downstream O2 sensor 19 even if its output does not turn rich in a short time. Accordingly, it is required to extend air-fuel enrichment long enough to determine failure. It is determined that the downstream O2 sensor 19 has failed only when its output does not reverse during such an extended time period.

Figure 12:
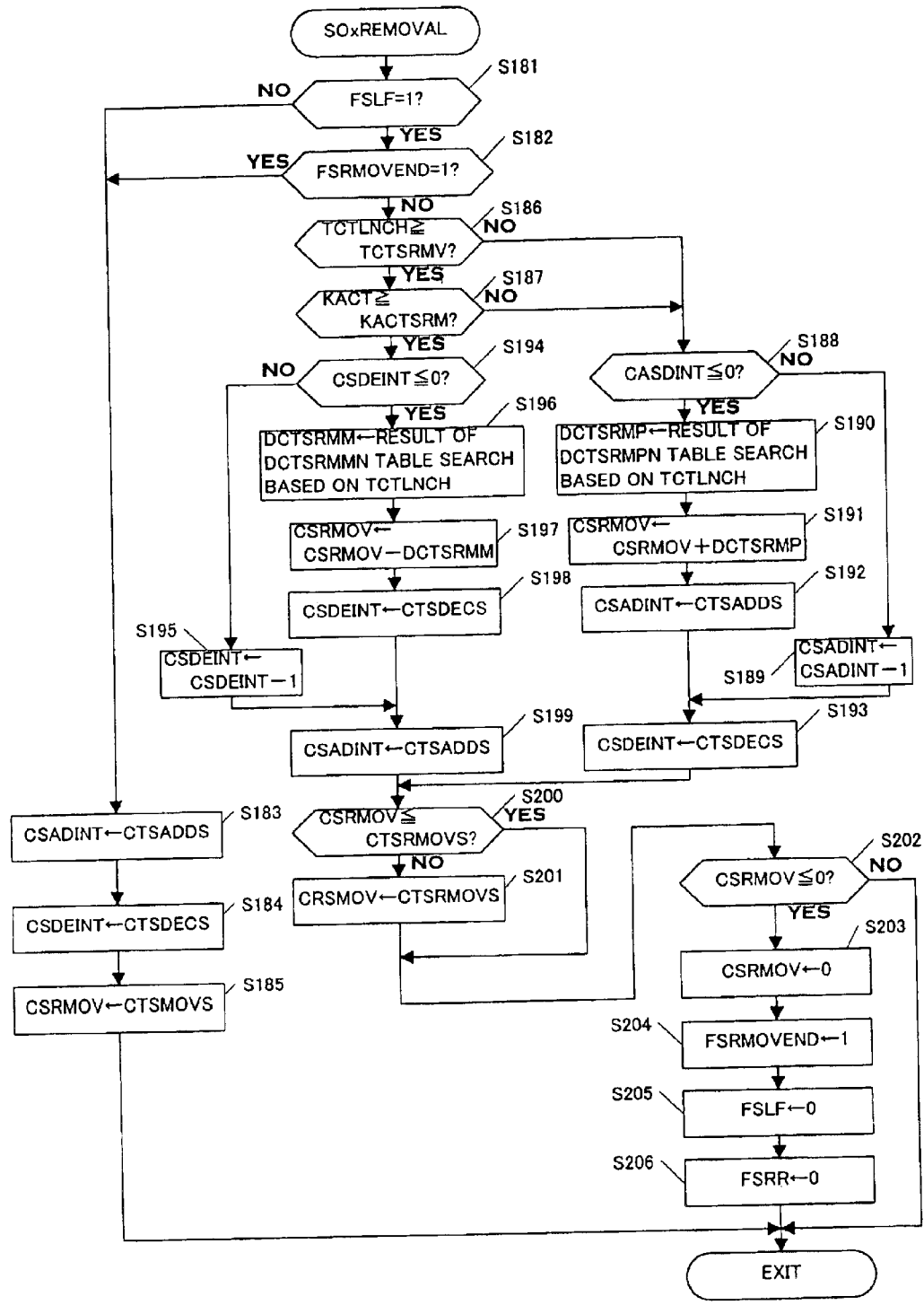
FIG. 12 is a flowchart showing a SOx removal process.

FIG. 12 shows a flow of a SOx removal process. The ECU 5 performs this process at a predetermined time interval (for example, every 100 millisecond). When it is determined that the influence of the SOx is high in the deterioration determination process for the NOx purifying device (in other words, the high density flag FSLF has been set to 1 in step S166), accuracy of the deterioration determination is improved by performing SOx removal process once after deterioration determination is suspended. It should be noted that lean operation is prohibited during the SOx removal process (in other words, when FSLF=1 and FSRMOVEND=0) as to be described with reference to FIG. 13.

In step S181, it is determined whether or not the high-density flag FSLF has been set to 1. When FSLF=0, a first predetermined value CTSADDS is set to a first countdown counter CSADINT in step S183, a second predetermined value CTSDECS is set to a second countdown counter CSDEINT in step S184, a third predetermined value CTSMOVS (for example, 6000) is set on a SOx trapping amount counter CSRMOV in S185, and then the process exits here. The value CTSRMOVS is set to a value corresponding to a time period within which all SOx can be removed even when trapped SOx amount in the NOx purifying device 15 has reached its maximum amount (saturated state).

When FSLF=1 in step S181, which indicates that the SOx density is high, it is determined in step S182 whether or not the SOx removal end flag FSRMOVEND is set to 1. The answer is YES when the SOx removal process has been completed. The process proceeds to step S183. When the answer is NO, it is determined in step S186 whether or not an estimated temperature TCTLNCH of the NOx purifying device 15 is equal to or larger than a predetermined temperature TCTSRMV. TGTLNCH is calculated by searching a temperature map to be created based on such engine operating conditions as the engine rotational speed NE and the engine load (absolute air-intake-pipe internal pressure PBA). This calculation process is not shown. Alternatively, it is possible to provide a temperature sensor for detecting the temperature of the NOx purifying device and use such detected temperature instead of TCTLNCH.

When TCTLNCH<TCTSRMV in step S186, it is determined in step S188 whether or not the value of the first countdown counter CSADINT is equal to or smaller than zero. Initially, because CSADINT>0, the first countdown counter CSADINT is decremented by 1 in step S189, the second predetermined value CTSDECS is set to the second count-down counter CSDEINT in step S193, and the process proceeds to step S200. In the subsequent cycles, when the value of the counter CSADINT becomes zero, the process proceeds from step S188 to step S190, in which sulfur poisoning amount table DCTSRMPN is searched based on the estimated temperature TCTLNCH to obtain sulfur poisoning amount DCTSRMP. The table DCTSRMPN is set such that sulfur poisoning amount increases as the estimated temperature rises. Next, in step S191, a value according to the following equation (7) is set on sulfur poisoning amount counter CSRMOV.

$$CSRMOV = CSRMOV + DCTSRMP \qquad (7)$$

In the equation (7), CSRMOV represents the previously calculated value. Then, in step S192, the first predetermined value CTSADDS is set to the first countdown counter CSADINT, and the process proceeds to step S193.

When TCTLNCH is equal to or larger than TCTSRMV in step S186, it is determined in step S187 whether or not the detected equivalent ratio KACT is equal to and more than a predetermined equivalent ratio KACTSRM (for example, 1.03). The detected equivalent ratio KACT is to be obtained by converting the output of the LAF sensor 17 to a coefficient. When KACT<KACTSRM, the process proceeds to step S188. When KACT is equal to or larger than KACTSRM, the process proceeds to step S194, in which it is determined whether or not the second countdown counter CSDEINT is equal to or smaller than zero. Initially, because CSDEINT>0, the process proceeds to step S195, in which the counter CSDEINT is decremented by 1, and in step S199 the first predetermined value CTSADDS is set to the first countdown counter CSADINT, and then the process proceeds to step S200. In the subsequent cycles, when the value of the second countdown counter CSDEINT becomes zero, the process proceeds from step S194 to step S196, in which a sulfur removal amount table DCTSRMMN is searched based on the estimated temperature TCTLNCH to obtain a sulfur removal amount DCTSRMM. The sulfur removal amount table DCTSRMMN is set such that the sulfur removal amount increases as the estimated temperature rises. Next, in step S197, a value according to the following equation (8) is set to sulfur poisoning amount counter CSRMOV.

$$CSRMOV = CSRMOV \cdot DCTSRMM \quad (8)$$

In the equation (8), CSRMOV represents previously calculated value. Then, in step S198, the second predetermined value CTSDECS is set to the second countdown counter CSDEINT, and the process proceeds to step S199.

In step S200, it is determined whether or not the value of the sulfur poisoning amount counter CRSMOV is equal to or smaller than a predetermined value CTSRMOVS. When CRSMOV is equal to or smaller than CTSRMOVS, the process proceeds to step S202. When CRSMOV>CTSRMOVS, the sulfur poisoning amount counter CRSMOV is set to a predetermined value CTSRMOVS, and the process proceeds to step S202. This process sets an upper limit for sulfur adhesion amount.

In step S202, it is determined whether or not the value of the sulfur poisoning amount counter CSRMOV is equal to or smaller than zero. When CRSMOV>0, the process exits. When the value of CRSMOV becomes zero, which indicates that the SOx removal process has been completed, the sulfur poisoning amount counter CRSMOV is set to zero in step S203, the SOx removal end flag FSRMOVEND is set to 1 in step S204, the high density flag FSLF is set to zero again in step S205, the SOx removal enrichment flag FSRR is set to zero in step S206, and the process exits.

According to the process of FIG. 12, when the estimated temperature TCTLNCH exceeds the predetermined temperature TCTSRMV and when the detected equivalent ratio KACT exceeds the predetermined equivalent ratio KACTSRM (that is, when the air-fuel ratio is rich), the process for removing the SOx in the three-way catalyst 14 is performed. The amount of SOx, which has accumulated in the three-way catalyst 14, is estimated through the sulfur poisoning amount counter CSRMOV. When the value of CSRMOV becomes zero, which indicates that the accumulated SOx has been removed, the SOx removal flag FSRMOVEND is set to 1.

When the estimated temperature TCTLNCH is below the predetermined temperature TCTSRM or when the detected equivalent ratio KACT is smaller than the predetermined equivalent ratio KACTSRM, SOx is not removed but rather it may accumulate in the three-way catalyst 14. Accordingly, the sulfur poisoning amount counter CSRMOV is incremented every time the value of the second countdown counter CSADINT becomes zero. The accumulation speed and the removal speed of SOx are different depending on the temperature of the three-way catalyst 14 (in other words, SOx accumulates less and is easier to remove as the temperature rises). Accordingly, the sulfur poisoning amount counter CSRMOV is incremented or decremented by amount that is obtained by searching the table. The first countdown counter CSADINT and the second countdown counter CSDEINT are provided as thinning-out counters to compensate for the difference between accumulation speed and removal speed of SOx.

By executing the SOx removal process for the three-way catalyst 14 when the SOx density is determined to be high, it is possible to prevent a wrong determination which may regard a variation in the delay time between the output of the upstream O2 sensor 18 and the output of the downstream O2 sensor 19 as a time deterioration of the NOx purifying device 15.

Figure 13:
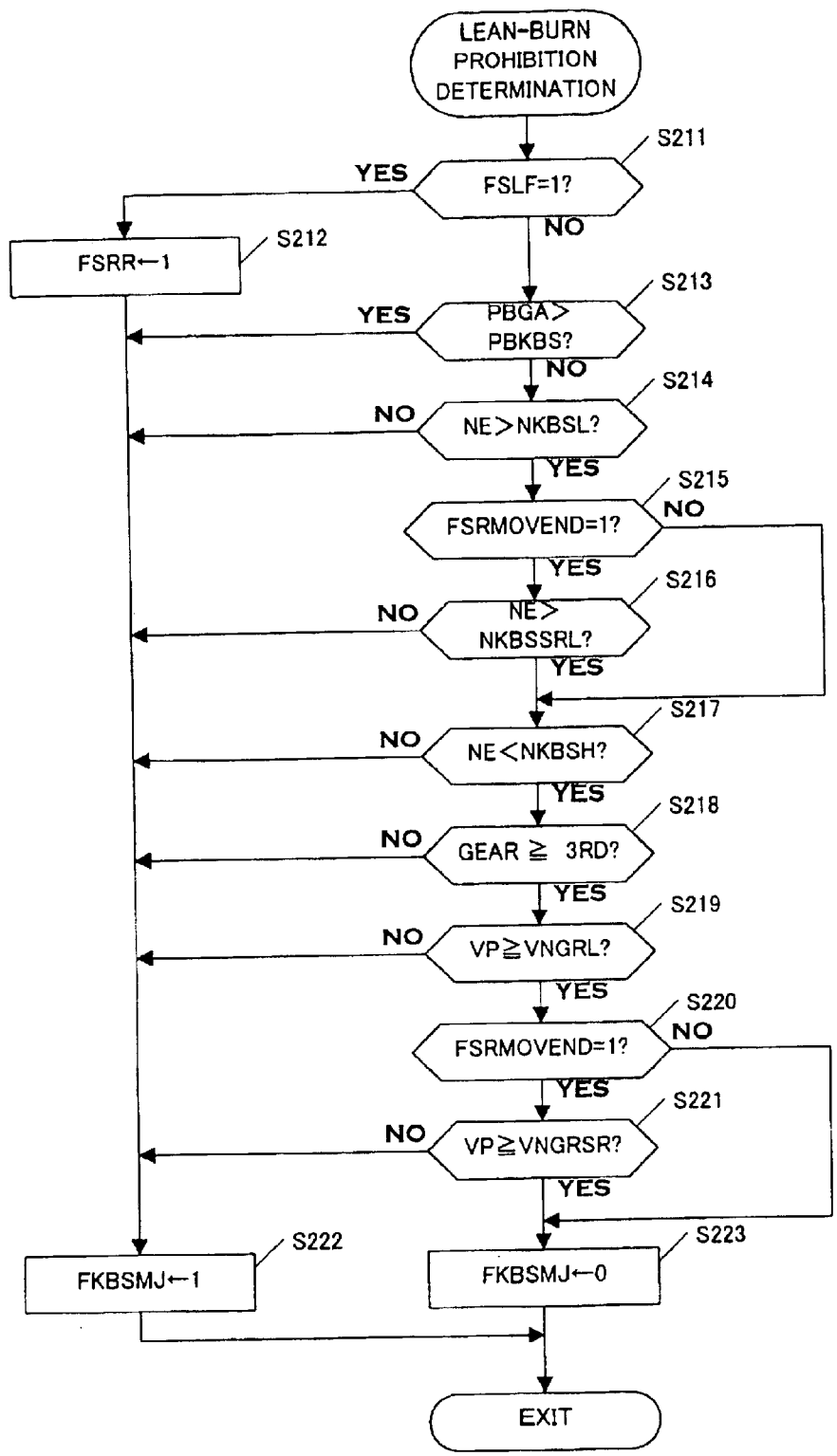
FIG. 13 is a flowchart showing a process for determining the lean-burn operation prohibition.

FIG. 13 is a flowchart of a process for prohibiting the lean operation, which sets the air-fuel ratio leaner than the stoichiometric air-fuel ratio, while the SOx removal process is being carried out. The ECU 5 in synchronization performs this process with occurrence of the TDC signal pulse. This process raises exhaust gas temperature and produces a rich operation so that removal of the SOx becomes easy.

In step S211, it is determined whether or not the high-density flag FSLF is set to 1. When FSLF=1 indicating that the SOx density is high, the SOx removal enrichment flag FSRR is set to 1 in step S212, and the lean-burn operation prohibiting flag FKBSMJ is set to 1 in step S222, so that the lean operation is prohibited.

When the high-density flag FSLF is set to zero, it is determined whether the lean-burn operation may be permitted or not according to the following steps. In step S213, it is determined whether or not the engine load PBGA exceeds a value PBKBS which is determined (in a process not shown herein) in accordance with operating conditions including the engine rotational speed. When PBGA>PBKBS, the process proceeds to step S222 to prohibit the lean-burn operation. When PBGA is equal to or smaller than PBKBS, it is determined in step S214 whether or not the engine rotational speed NE exceeds a predetermined value NKBSL (for example, 1000 rpm). When the answer is YES, it is further determined in step S215 whether or not the SOx removal end flag FSRMOVEND is set to 1. When FSRMOVEND=0, the process proceeds to step S217. When FSRMOVEND=1 indicating that the SOx removal process has been completed, it is determined in step S216 whether or not the engine rotational speed NE exceeds a value NKBSSRL (for example, 2000 rpm) which is set slightly larger than NKBSL. When the answer is YES, it is further determined in step S217 whether or not the engine rotational speed NE is smaller than a predetermined value NKBSH (for example, 3000 rpm). When NE<NKBSH, the process proceeds to step S218.

When the engine rotational speed NE is not larger than NKBSL or NKBSSRL in steps S214 and S216, or when the engine rotational speed NE is in a higher rotation region than NKBSH in step S217, the process proceeds to step S222 to prohibit the lean-burn operation.

In step S218, it is determined whether or not a gear position (a gear position conversion value of the CVT car)

is equal to or higher than the third gear position. When it is equal to or lower than the second gear position, the lean-burn operation is prohibited.

When the answer in step S218 is YES, that is, when the gear is in a higher position, it is determined in step S219 whether or not a vehicle speed VP is equal to or larger than a predetermined value VNGRL (for example, 30 km/h). If the answer is YES, it is determined in step S220 whether not the SOx removal end flag FSRMOVEND is set to 1. When FSRMOVEND=0, the process proceeds to step S223. When FSRMOVEND=1 indicating that the SOx removal process has been completed, it is determined in step S221 whether or not the vehicle speed VP is equal to or larger than a value VNGRSR (for example, 40 km/h) which is slightly larger than VNGRL. If this answer is YES, the lean-burn prohibition flag FKBSMJ is set to zero, so as to permit the lean operation.

When the answer in step S219 or S221 is NO, the process proceeds to step S222, in which the lean-burn operation is prohibited.

When the high-density-sulfur containing fuel is used (FSLF=1), the lean operation is not permitted in step S222 so as to perform the SOx removal process. When the high-density flag FSLF is set to zero, the lean operation may be permitted depending on the operating conditions of the engine 1. Specifically, the lean operation is permitted in step S223 only when the engine load PBGA is low, the engine rotational speed NE is in a low rotation region, the gear is equal to or higher than the third position and the vehicle speed VP is in an intermediate speed region. Besides, when the SOx removal process has been completed, reference values in terms of the engine rotational speed NE and the vehicle speed VP are reset to higher values so as to determine whether to permit the lean operation. Thus, because the sulfur adhesion to the three-way catalyst 14 relates with the exhaust gas temperature, the sulfur adhesion can be reduced by prohibiting lean-burn operation when the engine temperature is low and the exhaust gas temperature is low or when the engine rotational speed is low. As a result, the influence by the sulfur is excluded, and accuracy of the deterioration determination can be improved.

Although the present invention has been above described with respect to specific embodiments, such embodiments are not intended to limit the scope of the invention but various variations and alternatives should be regarded to be included in the scope of the invention.

According to this invention, the lean operation limiter limits the operation region of the internal-combustion engine after the exhaust gas purifier has recovered from the sulfur poisoning, so that the deterioration determination upon the exhaust gas purifier may be formed in conditions under which influence by the sulfur poisoning is limited. Thus, it is possible to accurately measure the nitrogen oxide trapping capability of the exhaust gas purifier even when the engine is driven with a high-density sulfur containing fuel.

What is claimed is:

1. An exhaust gas purifying apparatus for an internal-combustion engine having an exhaust gas purifier provided in an exhaust system of the engine and an oxygen density sensor disposed downstream of the purifier, the purifier including a nitrogen oxide purifier for purifying nitrogen oxide contained in the exhaust gas during a lean operation in which air-fuel ratio of air-fuel mixture to be supplied to the engine is lean, the exhaust gas purifying apparatus comprising:

a sulfur oxide detector for detecting density of sulfur oxide in the exhaust gas purifier;

sulfur-poisoning recovery means for recovering the exhaust gas purifier from sulfur poisoning when it is determined by the sulfur oxide detector that the sulfur oxide density is high;

a lean operation limiter for limiting lean operation of the engine to such operation region that is not influenced significantly by sulfur poisoning after the exhaust gas purifier recovery is done by the sulfur-poisoning recovery means; and means for determining deterioration of the exhaust gas purifier based on output of the oxygen density sensor only after the exhaust gas purifier has recovered from sulfur poisoning and during the lean operation of the engine.

2. The exhaust gas purifying apparatus according to claim 1, wherein the exhaust purifier includes a three-way catalyst and wherein the exhaust gas purifying apparatus includes a second oxygen density sensor provided between the three-way catalyst and the nitrogen oxide purifier, the sulfur oxide detector detecting sulfur oxide density based on the output of the second oxygen density sensor.

3. The exhaust gas purifying apparatus according to claim 2, wherein the sulfur oxide detector detects that a high sulfur-content fuel is being used if the output of the second oxygen density sensor does not reach a reference value when an accumulated intake-air volume reaches a predetermined value.

4. The exhaust gas purifying apparatus according to claim 1, wherein, when the sulfur oxide detector detects that the sulfur oxide density is high, said sulfur poisoning recovery means turns air-fuel ratio to rich until an estimated amount of sulfur adhered to the exhaust gas purifier is removed by rich exhaust gas.

5. The exhaust gas purifying apparatus according to claim 1, further comprising means for canceling limitation of operation region by the lean operation limiter when said means for determining deterioration determines that the exhaust gas purifier is normal.

6. An electronic control unit for an internal-combustion engine having an exhaust gas purifier provided in an exhaust system of the engine and an oxygen density sensor disposed downstream of the purifier, the purifier including a nitrogen oxide purifier for purifying nitrogen oxide contained in the exhaust gas during a lean operation in which air-fuel ratio of air-fuel mixture to be supplied to the engine is lean, the electronic control unit being programmed to:

detect density of sulfur oxide in the exhaust gas purifier;

recover the exhaust gas purifier from sulfur poisoning when it is determined by the sulfur oxide detector that the sulfur oxide density is high;

limit lean operation of the engine to such operation region that is not influenced significantly by sulfur poisoning after the exhaust gas purifier recovery is done by the sulfur-poisoning recovery operation; and determine deterioration of the exhaust gas purifier based on output of the oxygen density sensor only after the exhaust gas purifier has recovered from sulfur poisoning and during the lean operation of the engine.

7. The electronic control unit according to claim 6, wherein the exhaust gas purifier includes a three-way catalyst and wherein a second oxygen density sensor is provided between the three-way catalyst and the nitrogen oxide purifier, the electronic control unit being programmed to detect sulfur oxide density based on the output of the second oxygen density sensor.

8. The electronic control unit according to claim 7 further programmed to detect that a high sulfur-content fuel is being used if the output of the second oxygen density sensor does not reach a reference value when an accumulated intake-air volume reaches a predetermined value.

9. The electronic control unit according to claim 6 further programmed, when the sulfur oxide detector detects that the sulfur oxide density is high, to turn air-fuel ratio to rich until an estimated amount of sulfur adhered to the exhaust gas purifier is removed by rich exhaust gas.

10. The electronic control unit according to claim 6 further programmed to cancel limitation of operation region when it is determined that the exhaust gas purifier is normal.

11. Method for controlling an internal-combustion engine having an exhaust gas purifier provided in an exhaust system of the engine and an oxygen density sensor disposed downstream of the purifier, the purifier including a nitrogen oxide purifier for purifying nitrogen oxide contained in the exhaust gas during a lean operation in which air-fuel ratio of air-fuel mixture to be supplied to the engine is lean, comprising:

detecting density of sulfur oxide in the exhaust gas purifier;

recovering the exhaust gas purifier from sulfur poisoning when it is determined by the sulfur oxide detector that the sulfur oxide density is high;

limiting lean operation of the engine to such operation region that is not influenced significantly by sulfur poisoning after the exhaust gas purifier recovery is done by the sulfur-poisoning recovery operation; and determining deterioration of the exhaust gas purifier based on output of the oxygen density sensor only after the exhaust gas purifier has recovered from sulfur poisoning and during the lean operation of the engine.

12. The method according to claim 11, wherein the exhaust gas purifier includes a three-way catalyst and wherein a second oxygen density sensor is provided between the three-way catalyst and the nitrogen oxide purifier, the method comprising detecting sulfur oxide density based on the output of the second oxygen density sensor.

13. The method according to claim 12 further comprising detecting that a high sulfur-content fuel is being used if the output of the second oxygen density sensor does not reach a reference value when an accumulated intake-air volume reaches a predetermined value.

14. The method according to claim 11 further comprising, when a high sulfur oxide density is detected, turning air-fuel ratio to rich until an estimated amount of sulfur adhered to the exhaust gas purifier is removed by rich exhaust gas.

15. The method according to claim 11 further comprising canceling limitation of operation region when it is determined that the exhaust gas purifier is normal.

* * * * *